United States Patent
Chihara et al.

(10) Patent No.: US 9,723,579 B2
(45) Date of Patent: Aug. 1, 2017

(54) TRAFFIC DATA INTEGRATION METHOD AND TRAFFIC DATA INTEGRATION APPARATUS

(71) Applicant: FUJITSU LIMITED, Kawasaki-shi, Kanagawa (JP)

(72) Inventors: Koutarou Chihara, Fukuoka (JP); Harutaka Tanaka, Shime (JP); Wataru Nakamura, Fukuoka (JP); Takao Shikama, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 457 days.

(21) Appl. No.: 13/936,730

(22) Filed: Jul. 8, 2013

(65) Prior Publication Data

US 2013/0297820 A1    Nov. 7, 2013

Related U.S. Application Data

(63) Continuation of application No. PCT/JP2011/051968, filed on Jan. 31, 2011.

(51) Int. Cl.
*H04W 56/00* (2009.01)
*H04L 29/06* (2006.01)

(52) U.S. Cl.
CPC ....... *H04W 56/0005* (2013.01); *H04L 65/607* (2013.01)

(58) Field of Classification Search
CPC ......... H04L 41/00; H04L 43/00; H04L 51/00; H04L 61/00; H04L 65/00; H04L 67/00;
(Continued)

(56) References Cited

U.S. PATENT DOCUMENTS

2005/0018694 A1*  1/2005  Mitani et al. .................. 370/396
2005/0213540 A1*  9/2005  Matsumoto ........... H04L 1/1809
                                                              370/331

(Continued)

FOREIGN PATENT DOCUMENTS

JP    2000-244605     9/2000
JP    2003-264609     9/2003

(Continued)

OTHER PUBLICATIONS

International Search Report mailed Apr. 5, 2011 in corresponding International Application No. PCT/JP2011/051968.

(Continued)

*Primary Examiner* — Kostas Katsikis
*Assistant Examiner* — Billy H Ng
(74) *Attorney, Agent, or Firm* — Staas & Halsey LLP

(57) ABSTRACT

A traffic data integration method includes: obtaining, by using a computer, pieces of frame data having a same data pattern between first and second traffic data collected respectively by first and second capture devices that capture, as traffic data, frame data communicated by a node in a network; performing, by using the computer, a time correction process by which a time of each piece of frame data in the first and second traffic data is corrected so that capturing times of pieces of obtained frame data are identical; using, by using the computer, frame data for which a same data pattern does not appear repeatedly in a same capture device, as frame data for performing the time correction process; and restricting, by using the computer, a time difference of frame data used when the time correction process is performed.

10 Claims, 22 Drawing Sheets

(58) Field of Classification Search
CPC ...... H04L 69/00; H04L 65/607; H04W 24/08; H04W 56/0005; H04W 56/001; H04W 56/002; H04W 56/0025; H04W 74/0883; H04W 74/0891; H04W 56/004; H04W 56/005
USPC .......................................................... 709/233
See application file for complete search history.

(56) References Cited

U.S. PATENT DOCUMENTS

| | | | |
|---|---|---|---|
| 2006/0098607 A1* | 5/2006 | Zeng et al. ................... | 370/338 |
| 2007/0047591 A1* | 3/2007 | Senthilnathan ....... | H04L 1/0041 370/503 |
| 2007/0140295 A1* | 6/2007 | Akaboshi ............ | H04L 12/2602 370/468 |
| 2011/0007693 A1* | 1/2011 | Frusina et al. ................ | 370/329 |
| 2011/0280149 A1 | 11/2011 | Okada et al. | |

FOREIGN PATENT DOCUMENTS

| | | |
|---|---|---|
| JP | 2005-27252 | 1/2005 |
| JP | 2007-166453 | 6/2007 |
| JP | 2010-136157 | 6/2010 |
| WO | 2010/086907 | 8/2010 |
| WO | 2010/086907 A1 | 8/2010 |

OTHER PUBLICATIONS

PCT International Preliminary Report on Patentability mailed Aug. 15, 2013 in corresponding International Application No. PCT/JP2011/051968.

* cited by examiner

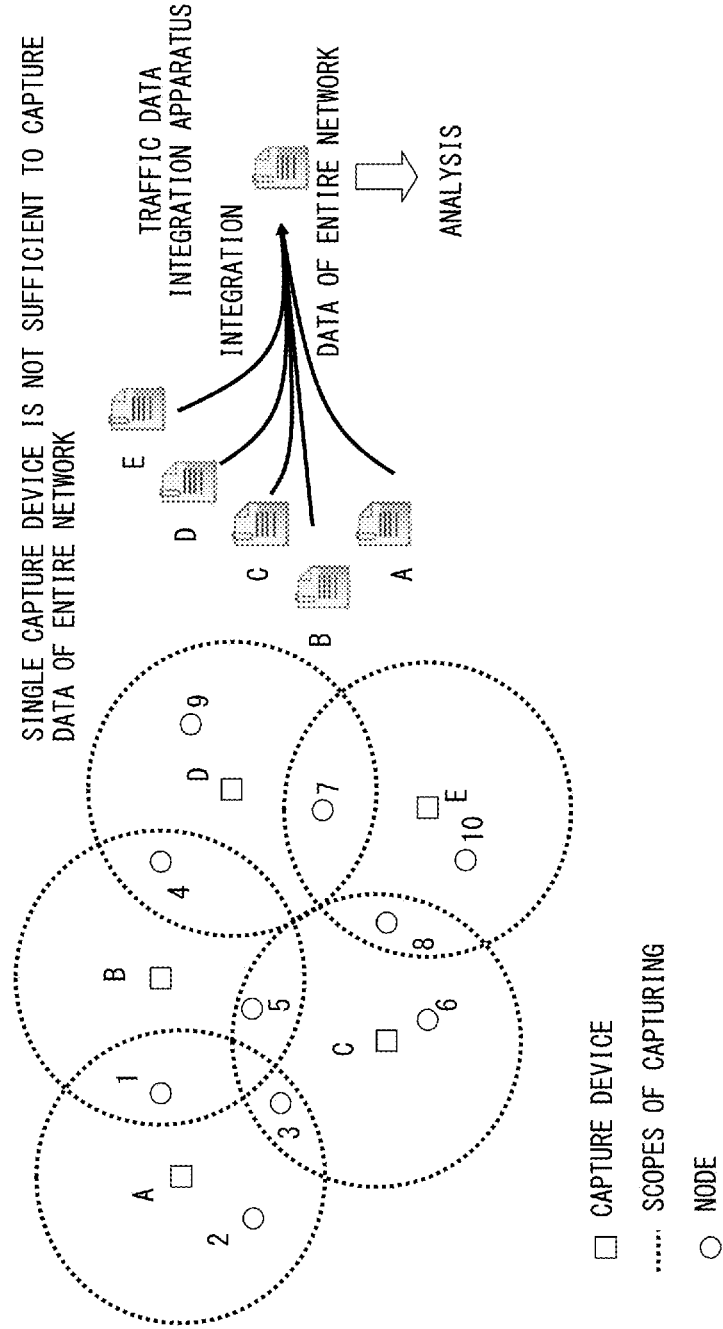
F I G. 1

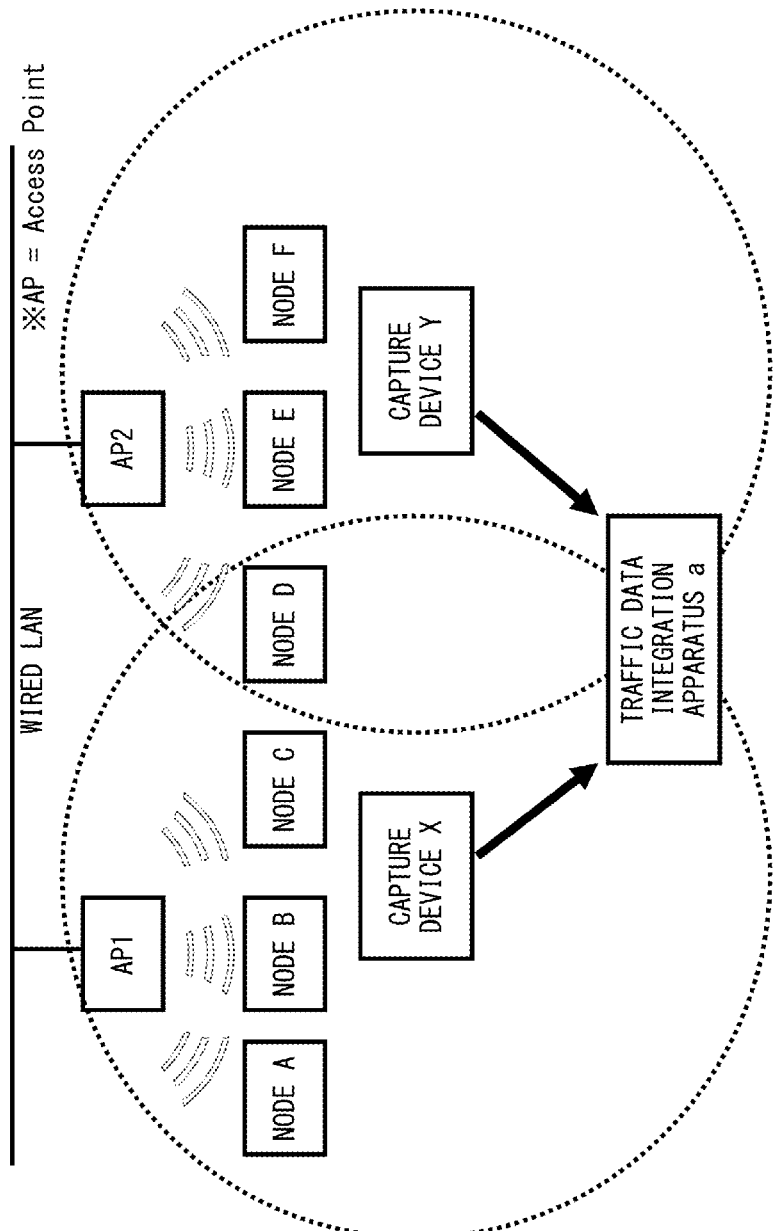
F I G. 4

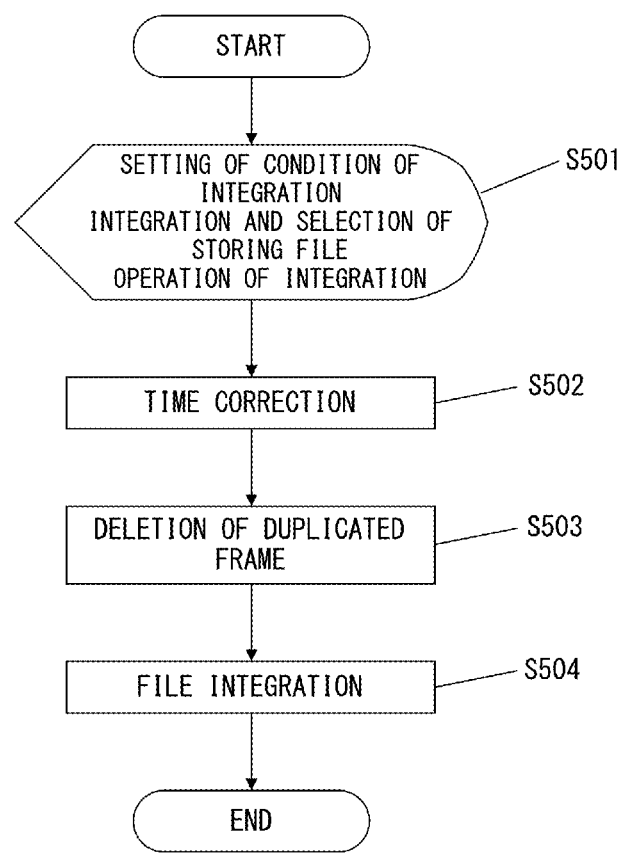
F I G. 5

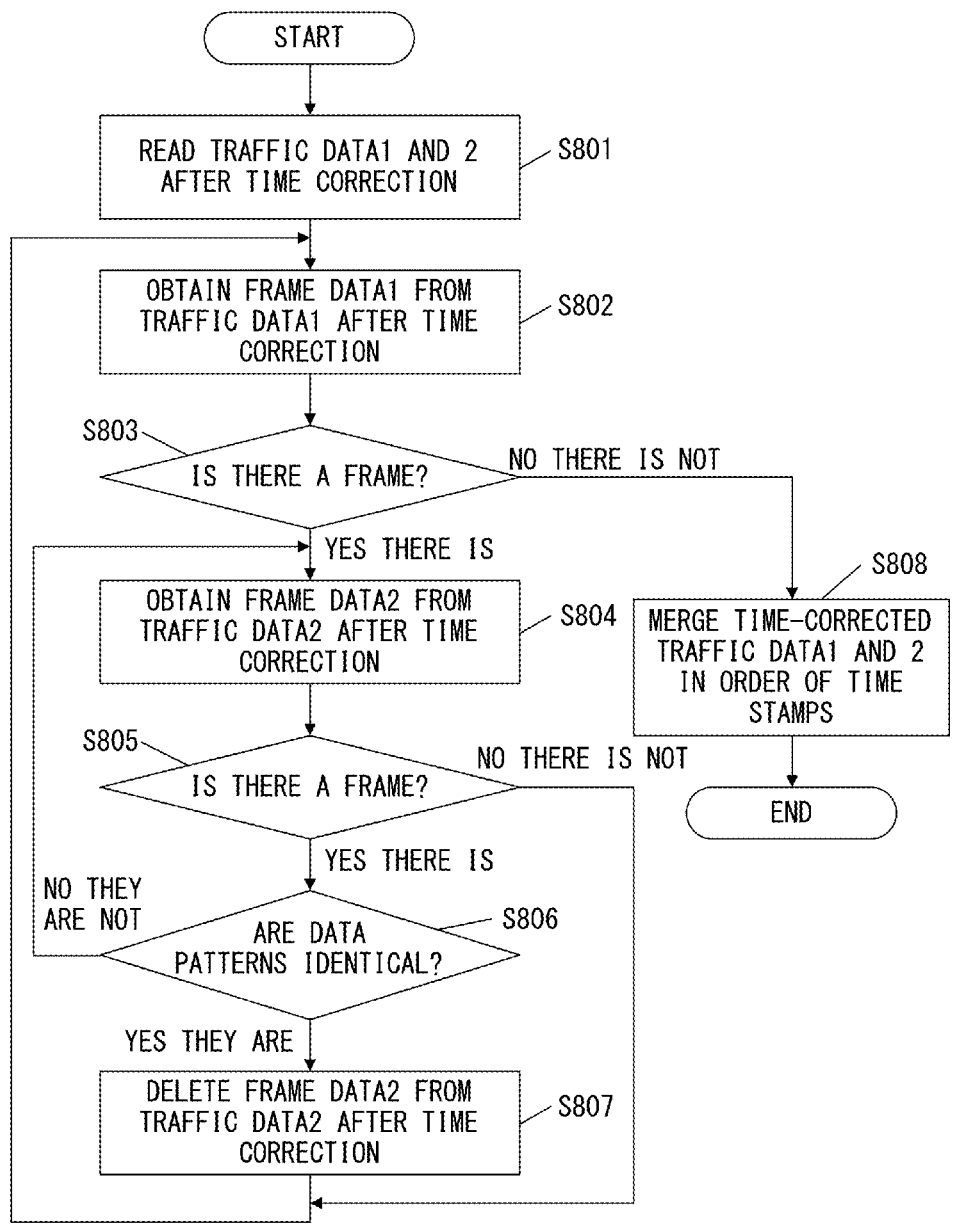
F I G. 8

INTEGRATED DATA 1001

| TIME STAMP | FRAME DATA |
|---|---|
| 2010/7/7 18:00:00.000 | AAAAAAAA |
| 2010/7/7 18:00:00.500 | FFFFFFFF |
| 2010/7/7 18:00:01.500 | GGGGGGGG |
| 2010/7/7 18:00:03.000 | BBBBBBBB |
| 2010/7/7 18:00:04.500 | HHHHHHHH |
| 2010/7/7 18:00:07.000 | CCCCCCCC |
| 2010/7/7 18:00:12.000 | DDDDDDDD |
| 2010/7/7 18:00:15.000 | EEEEEEEE |
| ... | |

F I G. 1 0

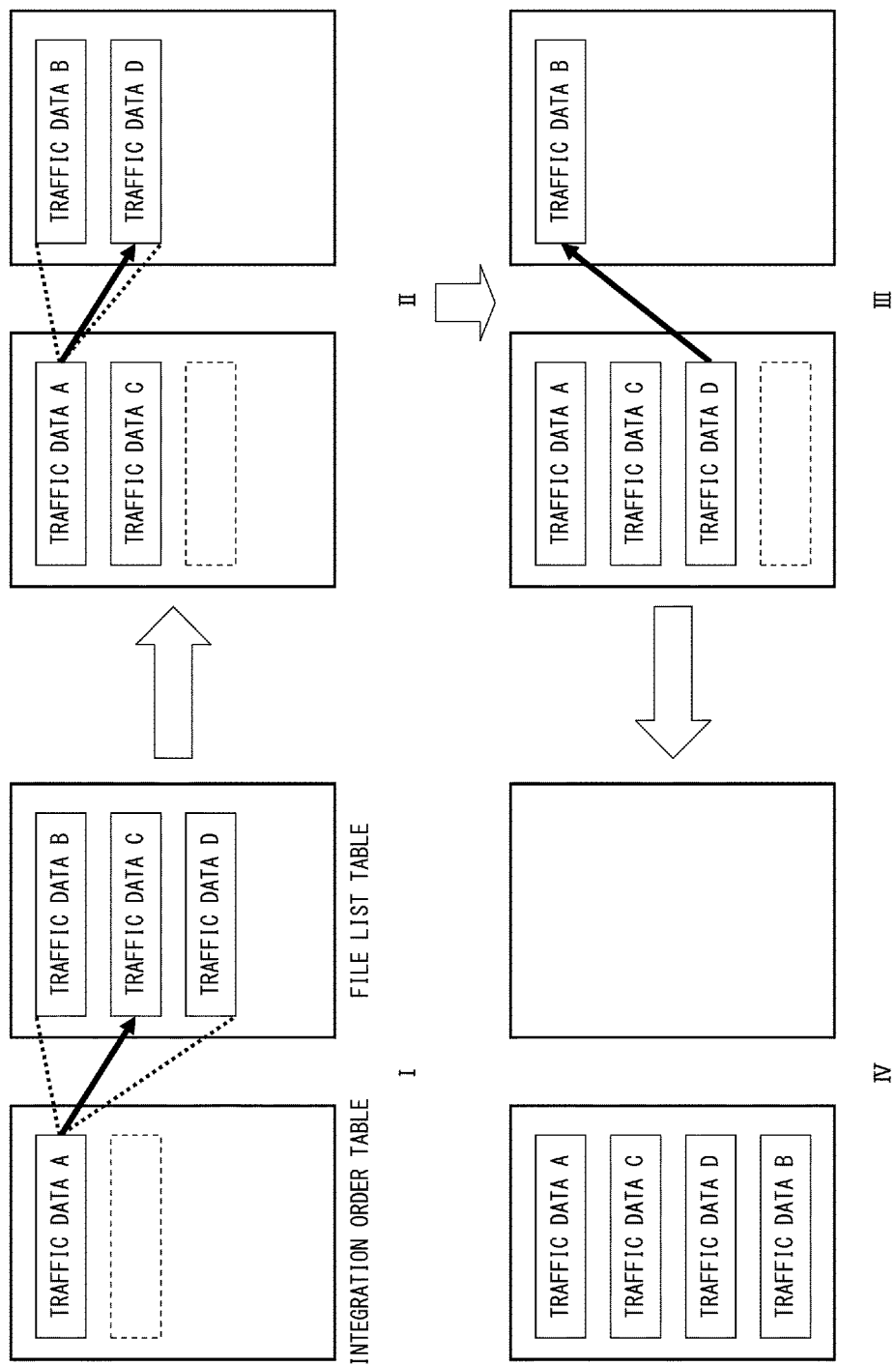
F I G. 14

DUPLICATED FRAME TABLE

| TIME STAMP | FRAME DATA | TRANSMISSION SOURCE NODE | CAPTURE DEVICE |
|---|---|---|---|
| 2010/7/7 18:00:03.000 | BBBBBBB | NODE1 | CAPTURE DEVICE A |
| | | | CAPTURE DEVICE B |
| | | | CAPTURE DEVICE C |
| 2010/7/7 18:00:07.000 | CCCCCCC | NODE2 | CAPTURE DEVICE A |
| | | | CAPTURE DEVICE B |
| ... | | | |

FIG. 17A

POSITIONAL INFORMATION TABLE

| CAPTURE DEVICE | ARRANGED POSITION | | SCOPES OF CAPTURING (DISTANCE FROM CENTER) |
|---|---|---|---|
| | X-COORDINATE | Y-COORDINATE | |
| CAPTURE DEVICE A | 100 | 300 | 150 |
| CAPTURE DEVICE B | 300 | 250 | 150 |
| CAPTURE DEVICE C | 200 | 100 | 150 |
| ... | | | |

FIG. 17B

| | 2101 | 2102 | 2103 |
|---|---|---|---|
| NODE | CAPTURE DEVICE | SIGNAL STRENGTH |
| 1 | A | SSI[A] |
| | B | SSI[B] |
| | C | SSI[C] |
| ... | | |
F I G.  1 9 A
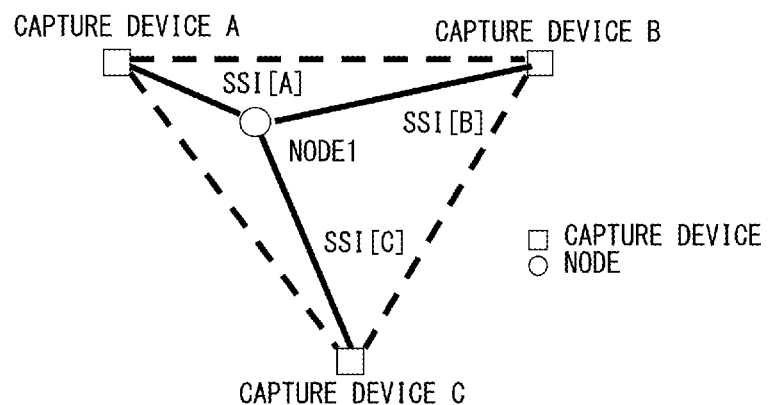
F I G.  1 9 B

DUPLICATED FRAME TABLE

| TIME STAMP | FRAME DATA | TRANSMISSION SOURCE NODE | CAPTURE DEVICE | SIGNAL STRENGTH |
|---|---|---|---|---|
| 2010/7/7 18:00:03.000 | BBBBBBB | NODE1 | CAPTURE DEVICE A | −50dBm |
| | | | CAPTURE DEVICE B | −70dBm |
| | | | CAPTURE DEVICE C | −65dBm |
| 2010/7/7 18:00:07.000 | CCCCCCC | NODE2 | CAPTURE DEVICE A | −55dBm |
| | | | CAPTURE DEVICE B | −55dBm |
| ... | | | | |

FIG. 20A

POSITIONAL INFORMATION TABLE

| CAPTURE DEVICE | ARRANGED POSITION | |
|---|---|---|
| | X-COORDINATE | Y-COORDINATE |
| CAPTURE DEVICE A | 100 | 300 |
| CAPTURE DEVICE B | 300 | 250 |
| CAPTURE DEVICE C | 200 | 100 |
| ... | | |

FIG. 20B

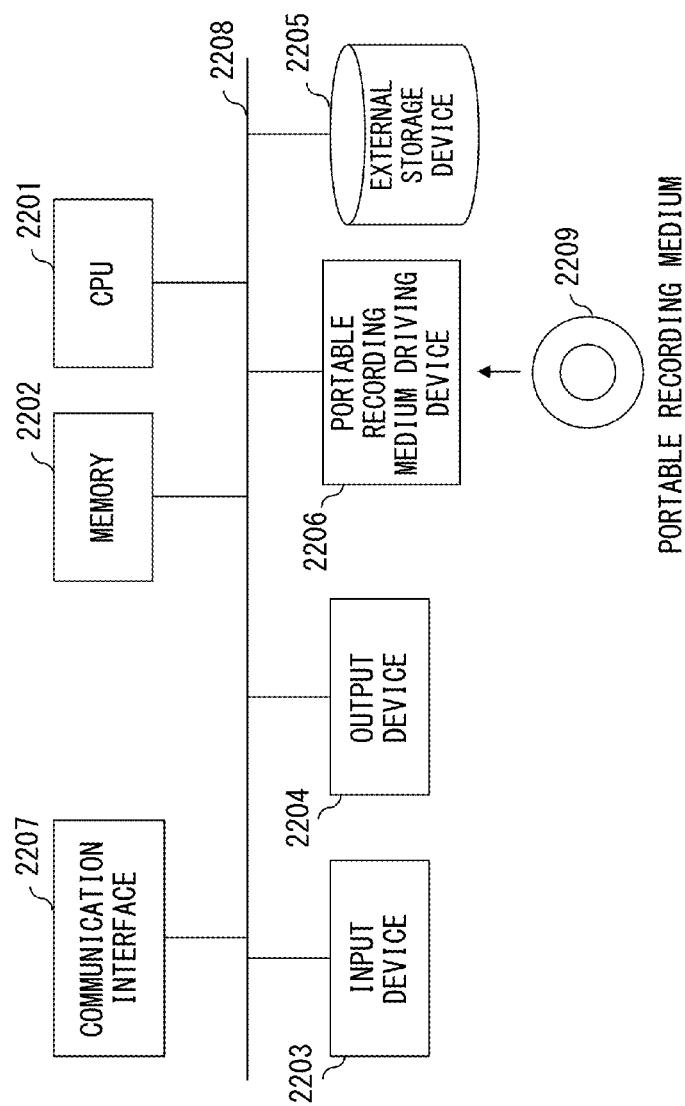
F I G. 2 2

TRAFFIC DATA INTEGRATION METHOD AND TRAFFIC DATA INTEGRATION APPARATUS

CROSS-REFERENCE TO RELATED APPLICATION

This application is a continuation application of International Application PCT/JP2011/051968 filed on Jan. 31, 2011 and designated the U.S., the entire contents of which are incorporated herein by reference.

FIELD

The embodiments described herein are related to a traffic data integration method and a traffic data integration apparatus that evaluate a network.

BACKGROUND

In a wireless network such as, for example, an ad-hoc network or the like (or other networks), traffic data of the network is sometimes captured and analyzed by using a capture device in order to analyze/check behavior of the network. A capture device collects data representing radio wave conditions of nodes in a network. When a network covers a large area or when a network includes areas blocked by buildings or the like, where radio wave conditions vary due to such blocking, a single capture device is not capable of capturing radio wave conditions of all nodes, and accordingly a plurality of capture devices are used for collecting data, and pieces of the captured data are integrated.

As a conventional technique, a "network analyzer" (packet analyzer) is known. According to an analyzer technique, pieces of data from a plurality of capture devices are integrated on the basis of times at which capturing of the plurality of pieces of captured data is performed (time stamps).

Also, as a conventional technique, a communication estimation system for estimating communications conducted between first and second opposite communication protocol execution units on the basis of newly designed first and second pieces of communication protocol information 1 and 2 is known that includes a time information generation unit configured to generate time information, first and second trace information storage units configured to add, to operation information, time information generated by the time information generation unit during an operation so as to sequentially accumulate the information when an internal or external operation is performed in each of the first and second communication protocol execution units, and a trace information integration unit configured to integrate, on a same time axis on the basis of the time information to which each piece of operation information has been added, both operation information groups accumulated by the first and second trace information storage units (Patent Document 1, for example).

Also, as a conventional technique, a processing device for analyzing network traces by using data packets transmitted through a network is known that includes a memory unit configured to store trace data generated from a data packet, a packet analysis unit configured to search trace data for a pair of packets attributed to a same session so as to generate a precedence relationship of nodes, a sequence data generation unit configured to use the pair of packet data and the precedence relationship data so as to generate sequence data for estimating a time difference of a unique time axis of each node and to store the generated data, and an algorithm engine unit configured to calculate an estimated value of a time difference by using the sequence data, and to store the value in the memory (Patent Document 2, for example).

Further, as a conventional technique, a packet data analysis program for causing a computer to analyze packet data is known that includes a packet data collection step of collecting packet data obtained at a plurality of positions in a network and collecting time stamps, which are times at which pieces of the packet data were obtained, a message information obtainment step of obtaining message information, which is message-related information, from the packet data collected by the packed data collection step, and a time stamp correction step of correcting a difference in the time stamps based on positions on the basis of the message information obtained by the message information obtainment step (Patent Document 3, for example).

Further, as a conventional technique, a configuration is known that includes a compression determination unit configured to determine whether or not a plurality of packets are in a particular situation of a protocol sequence so as to determine that a plurality of packets in a particular situation can be compressed, and a protocol sequence display unit configured to generate output data that outputs an exchange of the plurality of packets that can be compressed (Patent Document 4, for example).

Patent Document 1: Japanese Laid-open Patent Publication No. 2000-244605
Patent Document 2: Japanese Laid-open Patent Publication No. 2005-27252
Patent Document 3: Japanese Laid-open Patent Publication No. 2007-166453
Patent Document 4: Japanese Laid-open Patent Publication No. 2003-264609

SUMMARY

According to an aspect of the embodiments, a traffic data integration method is provided that includes: obtaining pieces of frame data having a same data pattern between first and second traffic data collected respectively by first and second capture devices that capture, as traffic data, frame data communicated by a node in a network; performing a time correction process by which a time of each piece of frame data in the first and second traffic data is corrected so that capturing times of pieces of obtained frame data are identical; using frame data for which a same data pattern does not appear repeatedly in a same capture device, as frame data for performing the time correction process; and restricting a time difference of frame data used when the time correction process is performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates capturing and integration of traffic data in a wireless network.

FIG. 4 illustrates a configuration of a network according to the first embodiment;

FIG. 5 is a flowchart for a traffic data integration process according to the first embodiment;

FIG. 8 is a flowchart for a duplicated frame deletion process according to the first embodiment;

FIG. 10 illustrates an example of integrated data obtained by integrating traffic data according to the first embodiment;

FIG. 14 explains an integration process in the network illustrated in FIG. 13 as an example of the method of determining adjacency relationships between scopes of capturing according to the third embodiment;

FIG. 17A and FIG. 17B illustrate configuration examples of management data for estimating the position of a node on the basis of overlapping of scopes of capturing according to the fourth embodiment;

FIG. 19A and FIG. 19B explain a method of generating information to estimate the position of a node on the basis of duplicated frame data and wireless physical information according to the fourth embodiment;

FIG. 20A and FIG. 20B illustrate configurations of management data for estimating the position of a node on the basis of differences between signal strengths according to the fourth embodiment;

FIG. 22 illustrates a hardware configuration that can implement the systems of the respective embodiments.

DESCRIPTION OF EMBODIMENTS

Figure 2:
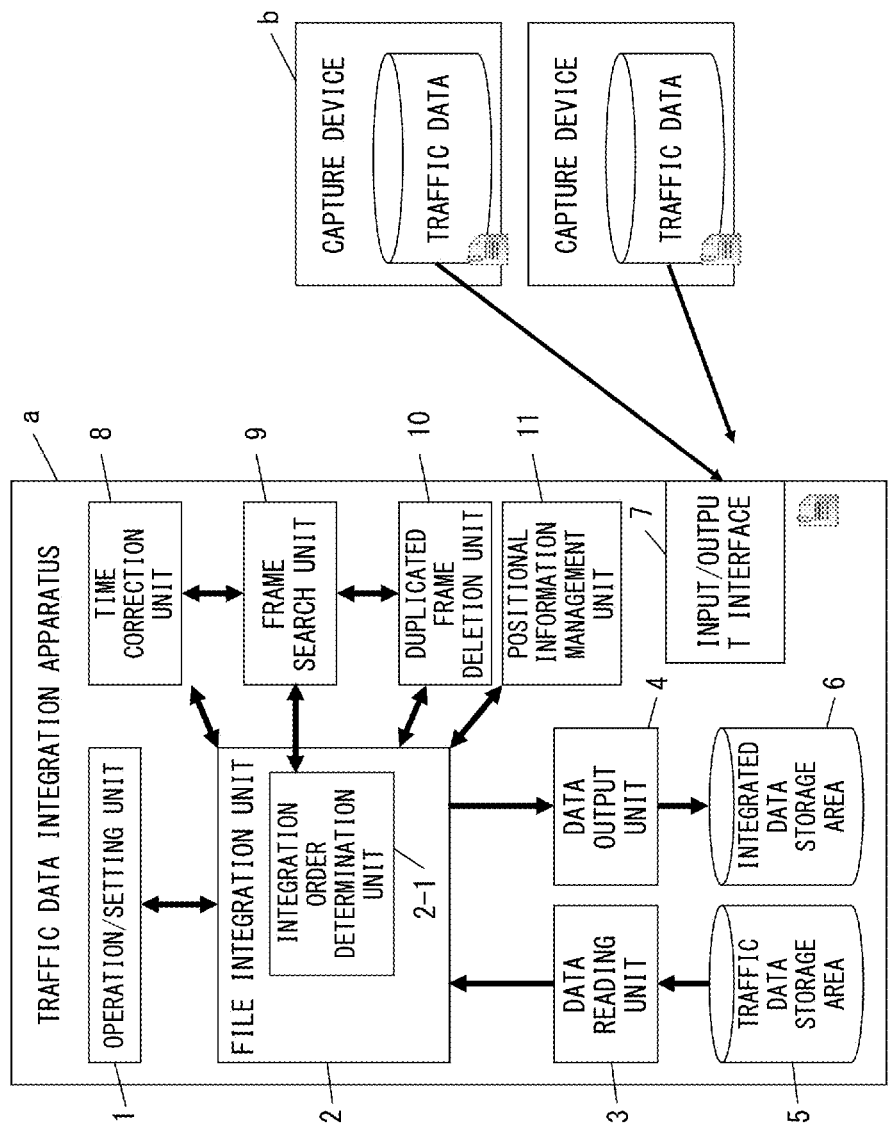
FIG. 2 illustrates a configuration that is common to first through fourth embodiments.

When a plurality of capture devices are used, time differences may sometimes occur between such capture devices, causing time differences between pieces of captured data. This may lead to a situation where pieces of data are merged in an order different from the actual order. Areas covered by a plurality of capture devices may overlap each other, and pieces of data from capture devices in such areas are counted duplicately.

It is an object of an embodiment of the present invention to make it possible to integrate pieces of traffic data in the order in which these pieces of traffic data actually flow through a network. Hereinafter, detailed explanations will be given for the embodiments of the present invention by referring to the drawings.

FIG. 1 illustrates capturing and integration of traffic data in a wireless network. A plurality of capture devices A, B, C, D, and E are arranged, and each of the capture devices covers respective nodes in its capturing scope, represented by a dashed-line circle, around itself. In this arrangement, pieces of data from the plurality of capture devices A, B, C, D, and E are collected and analyzed by a single traffic data integration apparatus.

FIG. 2 illustrates a configuration of the traffic data integration apparatus illustrated in FIG. 1. The configuration is common to the first through fourth embodiments. In FIG. 2, a traffic data integration apparatus, denoted by "a", includes an operation/setting unit 1, a file integration unit 2, a data reading unit 3, a data output unit 4, a traffic data storage area 5, an integrated data storage area 6, an input/output interface 7, a time correction unit 8, a frame search unit 9, and a duplicated frame deletion unit 10.

In the traffic data integration apparatus a, the operation/setting unit 1 is a unit by which a user sets a method of integrating traffic data and operates the integration. This operation/setting unit 1 is provided with a user interface such as a display, commands, etc.

The file integration unit 2 has a function of integrating (merging) a plurality of pieces of traffic data in accordance with values of time stamps added to frame data. Frame data used herein is communication data collected by respective capture devices from nodes existing in the scopes of capturing covered by those capture devices in FIG. 1.

The data reading unit 3 has a function of reading, from the traffic data storage area 5, a traffic data file as an integration target and an intermediate data file generated during an integration process.

The data output unit 4 has a function of outputting, to a file in the integrated data storage area 6, integrated data and intermediate data generated during an integration process.

Traffic data storage unit 5 is a data area functioning as a storage unit for storing traffic data files output from a plurality of capture devices b.

The integrated data storage area 6 is a data area functioning as a storage area for storing an integrated data file and an intermediate data file generated during an integration process.

The input/output interface 7 is an external interface for obtaining traffic data files output from the plurality of capture devices b and for outputting an integrated data file so that the file is used by a traffic data analysis tool, etc.

Further, a configuration according to the first embodiment includes the aspects below.

The time correction unit 8 utilizes the phenomenon that the same frame data of traffic data is captured duplicately in an area on which scopes of capturing overlap, and thereby corrects the time stamps of traffic data in such a manner that the pieces of frame data captured from the same frame have the same value as a time stamp. In other words, capturing times of all pieces of captured data are corrected by making the capturing time of obtained frame data have the same time on an assumption that a capture device and another capture device have the same data pattern. This correction is performed by adjusting the times in one capture device to those in another capture device. Upon this correction being made, data obtained by capturing the same frame as frame data that was captured by a capture device and that is included in the traffic data is captured by a different capture device. The frame search unit 9 is used for determining whether or not the data is included in the traffic data.

In other words, in order to detect frame data having the same data pattern as frame data included in traffic data, the frame search unit 9 searches different traffic data so that the same frame data is detected. For this search, a data frame for which the same data pattern repeatedly appears in a same capture device, e.g., retransmission data, is not used as a data frame for time correction. Retransmission data has a retransmission flag, and this retransmission flag is used for determining whether or not a data frame is a frame for which the same data pattern appears repeatedly. Further, a data frame time difference used for correction is set so that time correction can be conducted accurately even when there are great time differences between capture devices. In other words, when a data frame time difference used for time correction is set or limited to a great value (one minute, for example), a data frame can be captured by the frame search unit 9 as a data frame that functions as a correction time correction target even when there is a great time difference (one minute, for example) between data frames to be captured by capture devices. "Data pattern" used herein is the byte sequence of an entire frame that has actually flowed through a network.

The duplicated frame deletion unit 10 has a function of deleting duplicated data included in a plurality of pieces of traffic data, leaving one piece of the data. Whether or not data is duplicated is determined by searching for frame data having the same data pattern by using the frame search unit 9 described above.

As a configuration according to a second embodiment, the above traffic data integration apparatus includes, as a unit that detects the same frames in the frame search unit 9, a unit that checks the correspondence of time stamps in addition to checking whether data patterns are identical.

In some network protocols, frames having the same data pattern can be transmitted a plurality of times, as in a case of, for example, a retransmission process set by the protocol. Accordingly, it is not always possible to determine that the same frames were captured duplicately simply because data patterns are identical. Thus, when the duplicated frame deletion unit 10 searches for duplicated frames by using the frame search unit 9, the values are compared between time stamps after the time correction that have been given to pieces of frame data having the same data patterns. When the difference between the time stamps after the time correction is within a prescribed time range, such data frames are determined to be the same data frames so that one of the frames is deleted, and a merging process is performed. When the difference between time stamps has exceeded a prescribed time range, the data frames are determined to be different frames even when they have the same data patterns. A value specified by a user through the operation/setting unit 1 or set by the system beforehand is used as a threshold of a difference between time stamps serving as a determination reference.

As a configuration according to a third embodiment, the traffic data integration apparatus described above includes an integration order determination unit 2-1 in the file integration unit 2. The integration order determination unit 2-1 determines whether or not there are duplicated frames between pieces of traffic data so as to determine adjacency relationships between capture devices, and thereby determines an integration order when three or more pieces of traffic data are to be integrated.

When pieces of traffic data obtained by capture devices that are arranged at physically remote positions are integrated, target pieces of traffic data sometimes do not include duplicated frames, which prevents accurate time correction. However, accurate time correction can be conducted by using pieces of traffic data obtained by capture devices that are adjacent to the subject capture devices, respectively.

Figure 3:
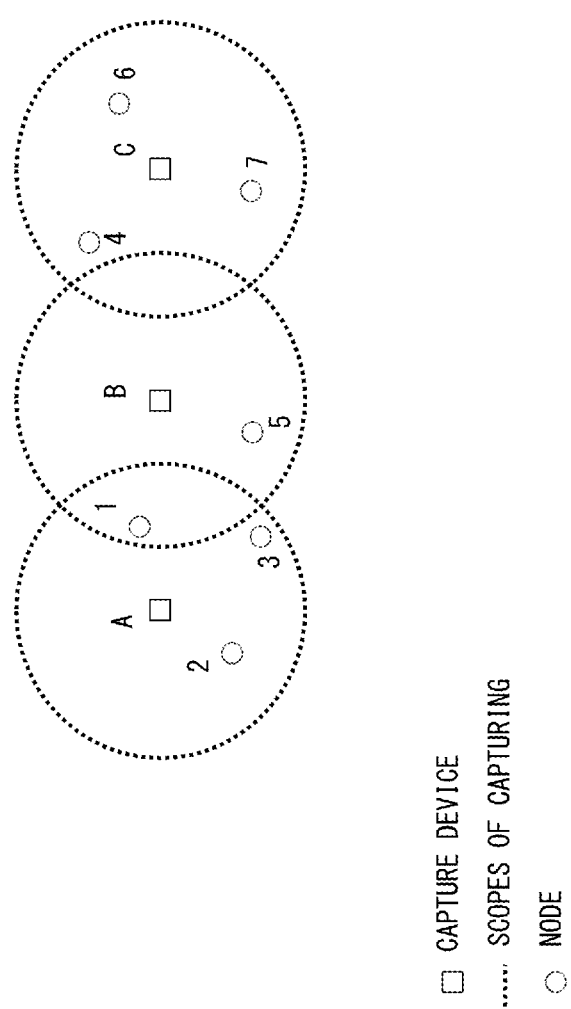
FIG. 3 illustrates operations of an integration order determination unit 2-1.

FIG. 3 illustrates operations of the integration order determination unit 2-1. In FIG. 3, the scope within which capture device A can capture data and the scope within which capture device C can capture data are apart from each other, and accordingly there are no duplicated frames among pieces of data captured by them. However, the scope within which capture device B captures data overlaps the respective scopes within which capture devices A and C can capture data, and accordingly duplicated frames will be captured. In such a case, when pieces of traffic data obtained by capture devices A and C are integrated first, accurate time correction is not possible. However, when pieces of traffic data obtained by capture devices A and B are integrated first and the integrated data and traffic data obtained by capture device C is integrated, accurate time correction is possible between pieces of traffic data obtained from scopes of capturing that do not overlap each other.

As a configuration according to a fourth embodiment, the frame search unit 9 of the traffic data integration apparatus illustrated in FIG. 1 includes a unit that estimates positions of nodes in accordance with wireless physical information included in traffic data, and includes a positional information management unit 11.

Traffic data output from a general capture device includes not only a byte sequence of an entire frame that actually flowed through a network but also wireless physical information (wave intensity, noise intensity, etc.) obtained by the capture device. It is possible to determine the magnitude relationships of distances between nodes and capture devices in accordance with the wireless physical information included in traffic data. By combining this with positional information of a capture device managed by the positional information management unit 11, logical position relationships between nodes can be estimated.

According to the configuration illustrated in FIG. 1 described above, time correction is possible even when there are time differences between capture devices, making it possible to integrate pieces of traffic data in an order in which data actually flows through a network.

Also, pieces of data having the same data pattern are merged into one piece of data upon integration, and are stored in a file so that it does not seem that pieces of data having the same data pattern were transmitted a plurality of times.

The configuration illustrated in FIG. 1 makes it possible to generate traffic data of an entire network by using a plurality of capture devices even in a network environment that does not allow a single capture device to capture the traffic data of the entire network. By using an analysis tool to analyze data generated in the configuration illustrated in FIG. 1, it is possible to efficiently analyze the operation of an entire network, which a single capture device is not capable of analyzing.

As a result of this, periods of time/man-hours can be reduced for the development of network devices and the construction/maintenance of networks, which as a result makes it possible to construct and maintain networks of a high quality.

Explanations will be sequentially given for the first through fourth embodiments of a traffic data integration apparatus having the configuration illustrated in FIG. 1.

First, the first embodiment of a traffic data integration apparatus will be explained.

FIG. 4 illustrates an example of a configuration of a network according to the first embodiment. Explanations will be given for the example illustrated in FIG. 4, in which access points AP1 and AP2 for a wireless LAN are connected through a wired LAN such as Ethernet (registered trademark), etc., terminal devices A through C are connected to access point AP1 through a wireless LAN, and terminal devices D through F are connected to access point AP2 through a wireless LAN. In this example, a wireless LAN is used as an example of a wireless network; however, the network to which the present embodiment is to be applied is not limited to a wireless LAN.

The example illustrated in FIG. 4 includes capture devices X and Y. Capture device X is arranged in such a manner that it can capture traffic data of access point AP1 and terminal devices A through D, and capture device Y is arranged in such a manner that it can capture traffic data of access point AP2 and terminal devices D through F. Each of the capture devices has a scope represented by a dashed-line circle. In this case, traffic data of terminal device D can be captured by both capture devices X and Y.

In the present embodiment, only a case in which a network covers a wide area and duplicated frames are only obtained from terminal device D has been described. However, capturing of traffic data may sometimes fail depending upon wave conditions even in a small-area network. In such a case, it is also possible to use a plurality of capture devices to obtain all pieces of traffic data without remainders.

Pieces of traffic data obtained by capture devices X and Y are collected to traffic data integration apparatus a. As a method of collecting pieces of data, a method in which a portable storage medium such as a USB memory or the like is used, and a method in which capture devices and a traffic data integration apparatus are connected through a network so as to collect pieces of data through the network are possible. In the method using a network, servers such as, for example, a file server or an FTP (File Transfer Protocol) server can be used.

Here, explanations will be given for an operation for a case where two capture devices are arranged and two pieces of traffic data are integrated. However, the number of files to be integrated is not limited to two, and may be three or more.

Next, explanations will be given for the entire flow of a traffic data integration process according to the first embodiment by using the flowchart illustrated in FIG. 5.

First, a user uses the operation/setting unit 1 so as to set conditions for integration, and initiates the integration process (step S501). Examples of conditions for integration include the file names of pieces of traffic data that are to be integrated, the file name of an output destination of the integrated data obtained as a result of the integration, integration order of data, etc.

When the integration process has been initiated, the file integration unit 2 uses the time correction unit 8 so as to correct time in traffic data (step S502). The time correction unit 8 uses the frame search unit 9 so as to search a plurality of traffic data files for duplicated pieces of frame data, and corrects times in such a manner that the time stamps of duplicated pieces of frame data have the same value.

Next, the file integration unit 2 uses the duplicated frame deletion unit so as to delete duplicated pieces of frame data included in a plurality of traffic data (step S503).

As a last step, pieces of traffic data from which duplicated pieces of frame data have been deleted are integrated (merged) in the order of time stamps after the time correction, and the result of the integration is output to a file (step S504).

Figure 6:
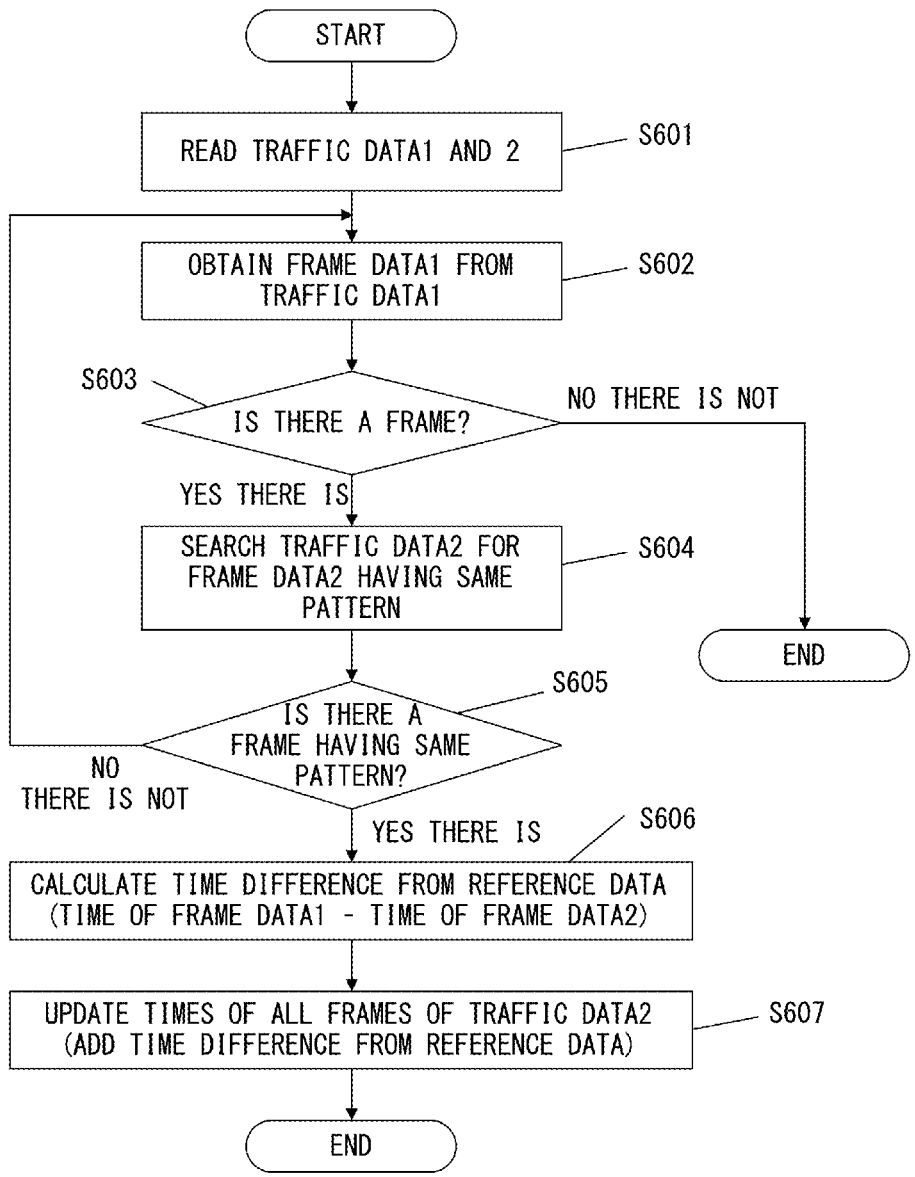
FIG. 6 is a flowchart for a time correction process according to the first embodiment.

FIG. 6 is a flowchart explaining a time correction process in step S502 illustrated in FIG. 5, executed by the time correction unit 8 illustrated in FIG. 2.

First, traffic data1 and traffic data2 are read as targets of time correction (step S601).

Next, frame data1 is obtained as one piece of frame data from traffic data1 (step S602).

Next, it is determined whether or not there is a frame, i.e., whether or not frame data1 was able to be obtained in step S602 (step S603).

When it has been determined in step S603 that there is a frame, traffic data2 is searched for framedata2 having the same pattern as frame data1 (step S604).

Next, it is determined whether or not the result of the search in step S604 indicates that there is a frame having the same pattern (step S605).

When there is not such a frame, the process returns to step S602, frame data1 is obtained as a next piece of frame data from traffic data1, and frame data2 having the same pattern is searched for frame data1. In other words, the processes in steps S605, S602, S603, S604, and S605 are repeated.

When all pieces of frame data in traffic data1 have been processed and it has been determined that there are no more frames in step S603, the time correction process is terminated.

When it has been determined in step S605 that there is frame data2 having the same pattern as frame data1, the time difference from the reference data is calculated by using the following expression (from step S605 to step S606).

(Time of Frame Data1−Time of Frame Data2)

As a last step, the time difference from the reference data is added to all frames of traffic data2 so as to update the times of all frames of traffic data2 (step S607). After this process, the time correction process is terminated.

Figures 7A, 7B:
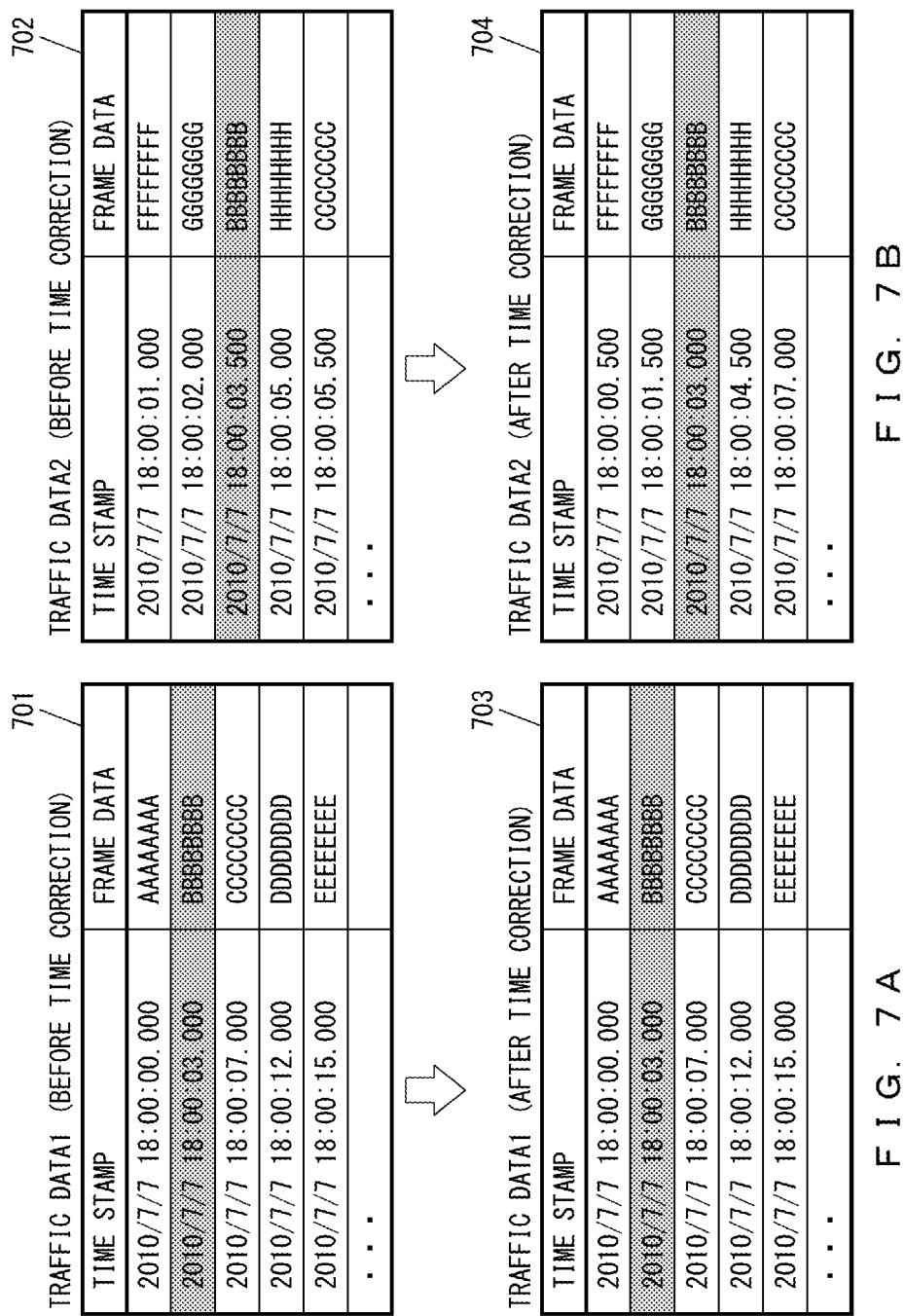
FIG. 7A and FIG. 7B illustrate examples of traffic data before and after time correction according to the first embodiment.

FIGS. 7A and 7B illustrate examples of traffic data before and after time correction according to the first embodiment.

In FIG. 7A, "701" denotes traffic data1 collected by a capture device before the time correction. In FIG. 7B, "702" denotes traffic data2 collected by a different capture device before the time correction. The traffic data includes frame data that flows through a network and times (time stamps) at which the pieces of frame data were captured by capture devices.

In the present example, it is assumed that the time stamp of "traffic data1 (before time correction)" (701) is correct while the time stamp of "traffic data2 (before time correction)" (702) is incorrect, and a method is used in which the time stamp of "traffic data2 (before time correction)" (702) is corrected. Hereinafter, "traffic data1 (before time correction)" (701) is referred to as "reference data".

First, first frame data "AAAAAAAA" of "traffic data1 (before time correction)" (701) is obtained (step S602 in FIG. 6). Thereafter, a search is conducted in order to determine whether or not "traffic data2 (before time correction)" (702) includes frame data having the data pattern of "AAAAAAAA" (steps S604 and S605 in FIG. 6). However, "traffic data2 (before time correction)" (702) does not include frame data "AAAAAAAA", and accordingly that frame is not used for time correction.

Next, second frame data "BBBBBBBB" of "traffic data1 (before time correction)" (701) is obtained (step S602 in FIG. 6), and a search is conducted in order to determine whether or not "traffic data2 (before time correction)" (702) includes frame data having the data pattern of "BBBBBBBB" (steps S604 and S605 in FIG. 6). "Traffic data2 (before time correction)" (702) includes frame data having the data pattern of "BBBBBBBB". Accordingly, that frame data is determined to be data resulting from capturing the same frame by different capture devices, and is used for time correction (step S605 to step S606 in FIG. 6).

Here, the time stamp of the frame data having data pattern "BBBBBBBB" is "2010/7/7 18:00:03.000" in "traffic data1 (before time correction)" (701) while the time stamp of the frame data having data pattern "BBBBBBBB" is "2010/7/7 18:00:03.500" in "traffic data2 (before time correction)" (702), with the time stamp in "traffic data2 (before time correction)" (702) being ahead by 500 milliseconds. Accordingly, the times of the respective frames in "traffic data2 (before time correction)" (702), which is not the reference data, are delayed by 500 milliseconds so that the time stamps of the pieces of frame data having the data patterns "BBBBBBBB" become identical (step S606 to step S607 in FIG. 6).

As a result of this, the time stamps in traffic data after time correction are updated, as illustrated in "traffic data1 (after time correction)" (703) and "traffic data2 (after time correction)" (704).

In the first embodiment described above, when one frame has an identical data pattern, the time stamps of all frames in traffic data that is not reference data are corrected by the time difference in that frame. For this, various methods can be employed such as a method in which an average value of time differences is obtained between a plurality of frames so as to use the value for correction, a method in which different pieces of data are used as the reference in units of frames, and other methods.

FIG. 8 is a flowchart for a duplicated frame deletion process to be executed by the duplicated frame deletion unit 10 of FIG. 2 in step S503 of FIG. 5

First, traffic data1 and traffic data2 after the above time correction are read as targets of duplicated frame deletion (step S801).

Next, frame data1 is obtained as one piece of frame data from traffic data1 after time correction (step S802).

Next, whether or not there is a frame, i.e., whether or not frame data1 was able to be obtained in step S802, is determined (step S803).

When it has been determined that there is a frame in step S803, frame data2 is obtained as one piece of frame data from traffic data2 after a time correction (step S804).

Next, whether or not there is a frame, i.e., whether or not frame data2 was able to be obtained in step S804, is determined (step S805).

When it has been determined in step S805 that there is a frame, whether or not the data pattern of frame data1 obtained in step S802 and the data pattern of frame data2 obtained in step S804 are identical is determined (step S806).

When the data patterns are not identical, the process returns to step S804, and frame data2 is obtained as a next piece of frame data from traffic data2, and whether or not that frame data2 and frame data1 are identical is determined. In other words, the processes in steps S806, S804, S805, and S806 are repeated.

When it has been determined in step S805 that all pieces of frame data in traffic data2 have been processed and there are no more frames, the process returns to step S802.

When it has been determined in step S806 that the data patterns of frame data1 and frame data2 are identical, current frame data2 is deleted from traffic data2 after the time correction (step S807). Thereafter, the process returns to step S802.

When the process has returned to step S802 from step S805 or S807, frame data1 is obtained as a next piece of frame data from traffic data1, and processes of duplication determination and deletion are executed on that frame data1. In other words, a series of the processes from step S802 through step S807 is repeated.

When all pieces of frame data in traffic data1 have been processed, and it has been determined in step S803 that there are no more frames, pieces of traffic data1 and traffic data2 after the time correction are merged in order of time stamps, and thereafter the duplicated frame deletion process is terminated (step S808).

Figures 9A, 9B:
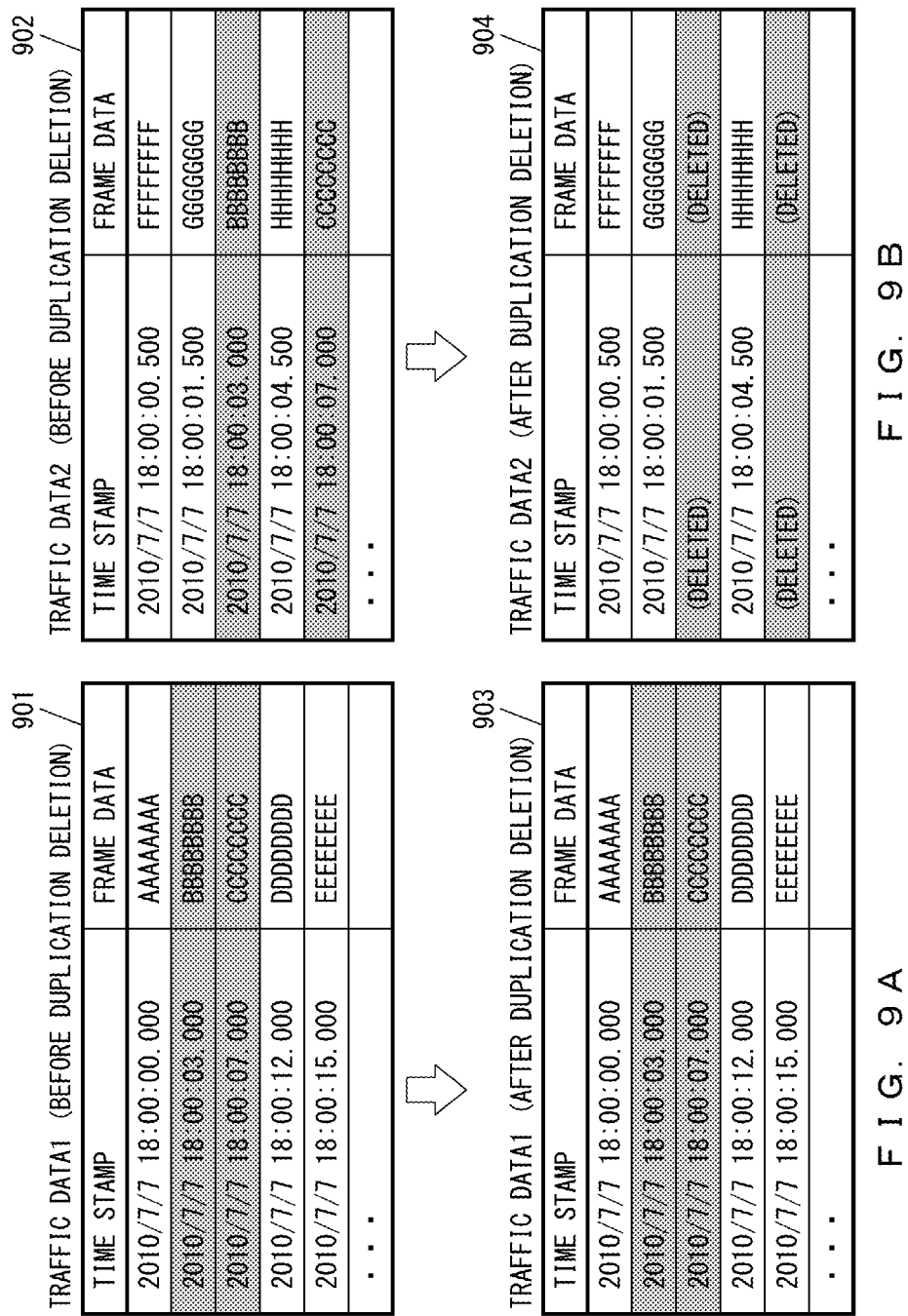
FIG. 9A and FIG. 9B illustrate examples of traffic data before and after deletion of duplicated frames according to the first embodiment.

FIGS. 9A and 9B illustrate examples of traffic data before and after duplicated frame deletion according to the first embodiment.

In FIG. 9A, "901" denotes traffic data1 that is collected from a single capture device after a time correction process and before duplication deletion. In FIG. 9B, "902" denotes traffic data2 that is collected from different capture device after a time correction process and before duplication deletion. Traffic data1 and traffic data2 are respectively identical to "traffic data1 (after time correction)" (703) illustrated in FIG. 7A and "traffic data2 (after time correction)" (704) illustrated in FIG. 7B.

Similarly to the case of time correction, "traffic data1 (after time correction)" (901) and "traffic data2 (after time correction)" (902) are searched in order to find frames having the same data pattern (from S802 through S806 in FIG. 8). As a result of this, there is duplication in data patterns "BBBBBBBB" and data patterns "CCCCCCCC". Accordingly, the frames having the data patterns "BBBBBBBB" and "CCCCCCCC" are deleted from "traffic data2 (after time correction)" (902), which is not the reference data (S807 in FIG. 8). As a result of this, "traffic data1 (after duplication deletion)" (903) and "traffic data2 (after duplication deletion)" (904) are obtained.

When pieces of these two groups of traffic data are merged in order of time stamps (S808 in FIG. 8), "integrated data" (1001) illustrated in FIG. 10 is output. In FIG. 10, there exist a single piece of data "BBBBBBBB" and a single piece of data "CCCCCCCC" after the duplication in frame data of "BBBBBBBB" and frame data of "CCCCCCCC" has been eliminated. The pieces of frame data "AAAAAAAA", "DDDDDDDD", and "EEEEEEEE" are obtained from traffic data1. The pieces of frame data "FFFFFFFF", "GGGGGGGG", and "HHHHHHHH" are obtained from traffic data2. These pieces of data are merged in order of the time stamps.

As described above, the configuration of the first embodiment can integrate two groups of traffic data. It is also possible to integrate three or more groups of traffic data by repeating the integration of two groups of traffic data.

Next, a second embodiment of a traffic data integration apparatus will be explained.

In the second embodiment, the correspondence between time stamps is checked in addition to the checking of whether or not data patterns are identical in the detection of the same frames in the process performed by the frame search unit 9 referred to by the duplicated frame deletion unit 10 illustrated in FIG. 2.

Figure 11:
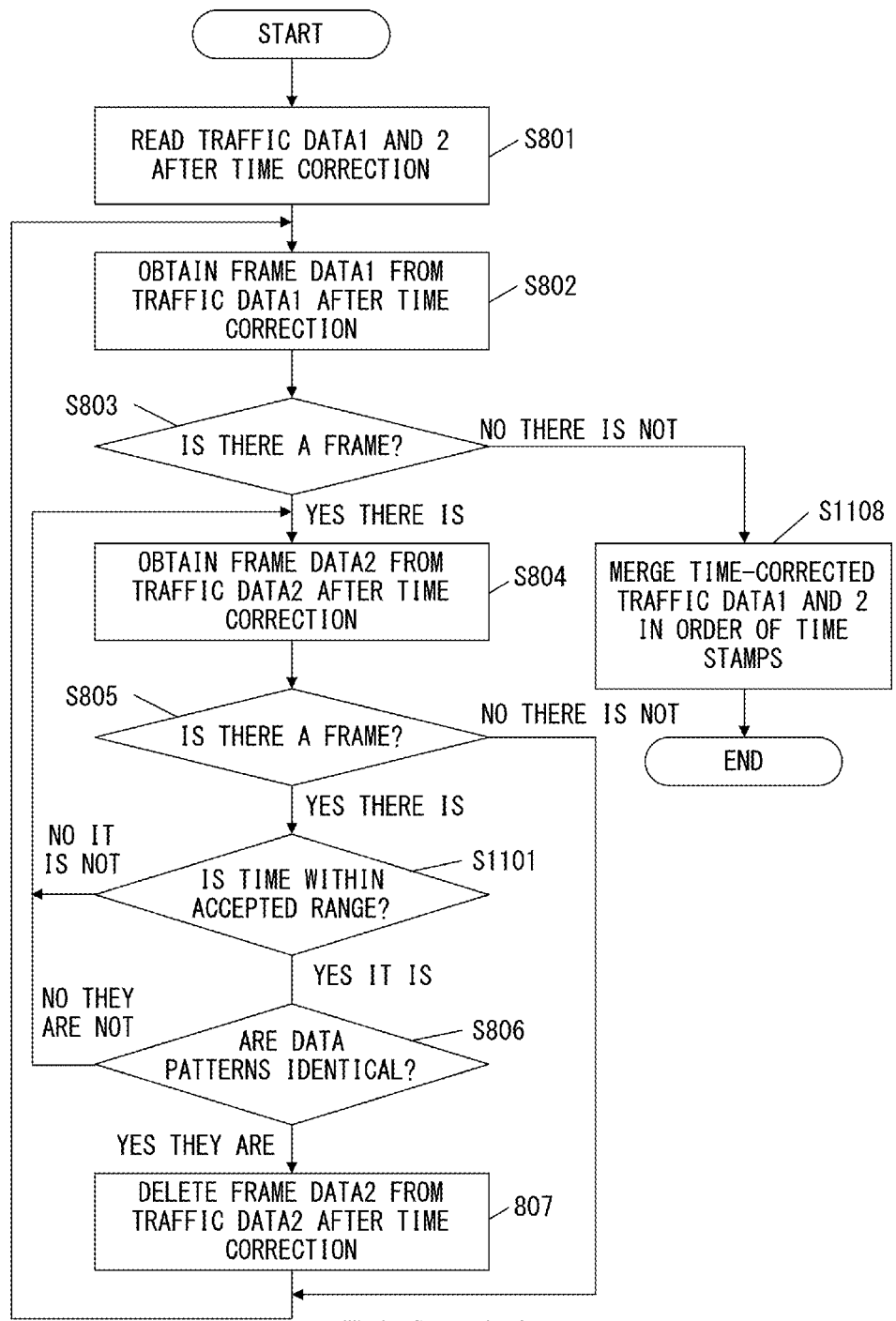
FIG. 11 is a flowchart for a duplicated frame deletion process that includes a process of checking a correspondence of time stamps according to the second embodiment.

FIG. 11 is a flowchart for a duplicated frame deletion process that includes a process of checking a correspondence between time stamps according to the second embodiment. In FIG. 11, steps of the same processes as in FIG. 8 according to the first embodiment are denoted by the same step numbers.

The process illustrated in FIG. 11 according to the second embodiment is different from the process illustrated in FIG. 8 according to the first embodiment in the following points. When it has been determined in step S805 of FIG. 11 that there is a frame of frame data2, it is first determined whether or not the times of (time difference between) frame data1 and frame data2 are within an acceptable range (step S1101). Only when the times of frame data1 and frame data2 are within the acceptable range, it is determined whether or not the data patterns are identical between frame data1 obtained in step S802 and frame data2 obtained in step S804 (step S806). When the times of frame data1 and frame data2 are not within the acceptable range, such pieces of data are not determined to be the same frame data, and the process returns to step S802 without performing a duplicated frame deletion process.

As described above, in the second embodiment, it is possible to perform a time stamp correspondence check, in which a duplicated frame deletion process is not conducted when times between frame data1 and frame data2 are sufficiently different.

Figures 12A, 12B:
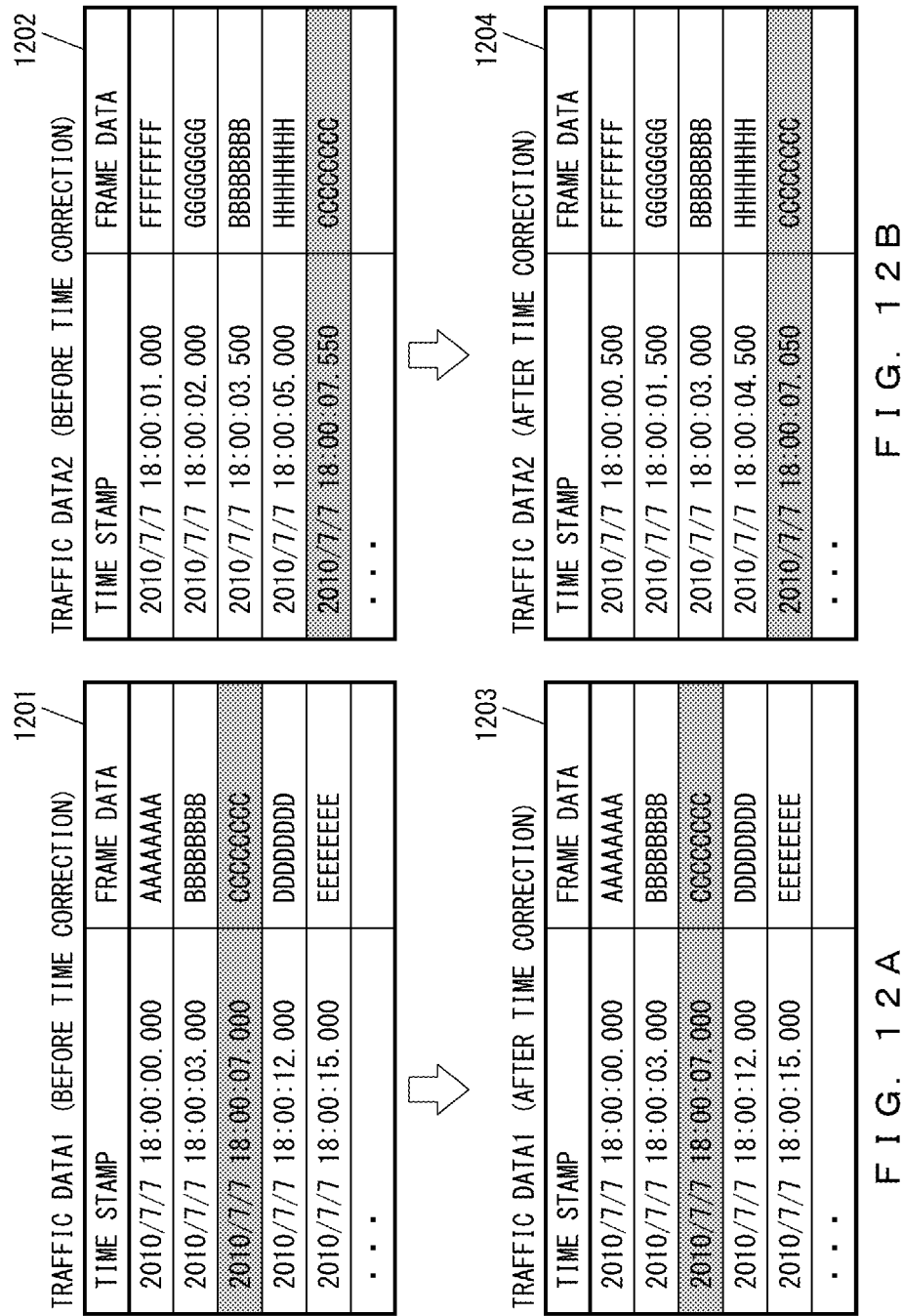
FIG. 12A and FIG. 12B illustrate examples of traffic data before and after time correction according to the second embodiment.

FIGS. 12A and 12B illustrate examples of traffic data before and after time correction according to the second embodiment. In FIG. 12A, "1201" denotes traffic data1 collected by a capture device before the time correction. In FIG. 12B, "1202" denotes traffic data2 collected by a different capture device before the time correction. Similarly to the case illustrated in FIGS. 7A and 7B according to the first embodiment, it is determined that traffic data1 and traffic data2 have the identical frame data, "BBBBBBBB". In response to this determination, the times of "traffic data2 (before time correction)" (1202) are delayed by 500 milliseconds, which is the difference in time stamps of the pieces of frame data "BBBBBBBB". As a result of this, "traffic data1 (after time correction)" (1203) has frame data "CCCCCCCC" with the time stamp of "2010/7/7 18:00:07.000" while "traffic data2 (after time correction)" 1204 has frame data "CCCCCCCC" with the time stamp of "2010/7/7 18:00:07.050", resulting in a time difference of 50 milliseconds. This is because differences in time stamps between frame data "BBBBBBBB" and between frame data "CCCCCCCC" do not correspond to each other over the groups of traffic data. This may sometimes happen depending upon process delay, etc., in capture devices.

In such a case, differences between time stamps after the time correction are accepted (step S1101 in FIG. 11) in order to avoid a situation where pieces of frame data having data patterns "CCCCCCCC", which are inherently the same frames, are determined to be different frames.

It is assumed as an example that the accepted range of differences between time stamps after the time correction of step S1101 in FIG. 11 is 100 milliseconds in the data illustrated in FIGS. 12A and 12B. In the examples illustrated in FIGS. 12A and 12B, there is a difference of 50 milliseconds between the time stamps of the frames having data pattern "CCCCCCCC", which is smaller than 100 milliseconds. As a result of this, traffic data1 and traffic data2 are determined to have the same frames having frame data "CCCCCCCC", and the corresponding frame is deleted as a duplicated frame from traffic data2 (from step S1101 to step S806 and step S807).

Next, a traffic data integration apparatus according to a third embodiment will be explained.

As described above, a traffic data integration method is provided that includes: obtaining pieces of frame data having a same data pattern between first and second traffic data collected respectively by first and second capture devices that capture, as traffic data, frame data communicated by a node in a network (S601 through S605); performing a time correction process by which a time of each piece of frame data in the first and second traffic data is corrected so that capturing times of pieces of obtained frame data are identical (S606 and S607); using frame data for which a same data pattern does not appear repeatedly in a same capture device, as frame data for performing the time correction process; and restricting a time difference of frame data used when the time correction process is performed.

In the above embodiments, explanations have been given based on an assumption that duplicated frames are included in a plurality of pieces of traffic data. However, duplicated frames are not always included in actual traffic data.

Figure 13:
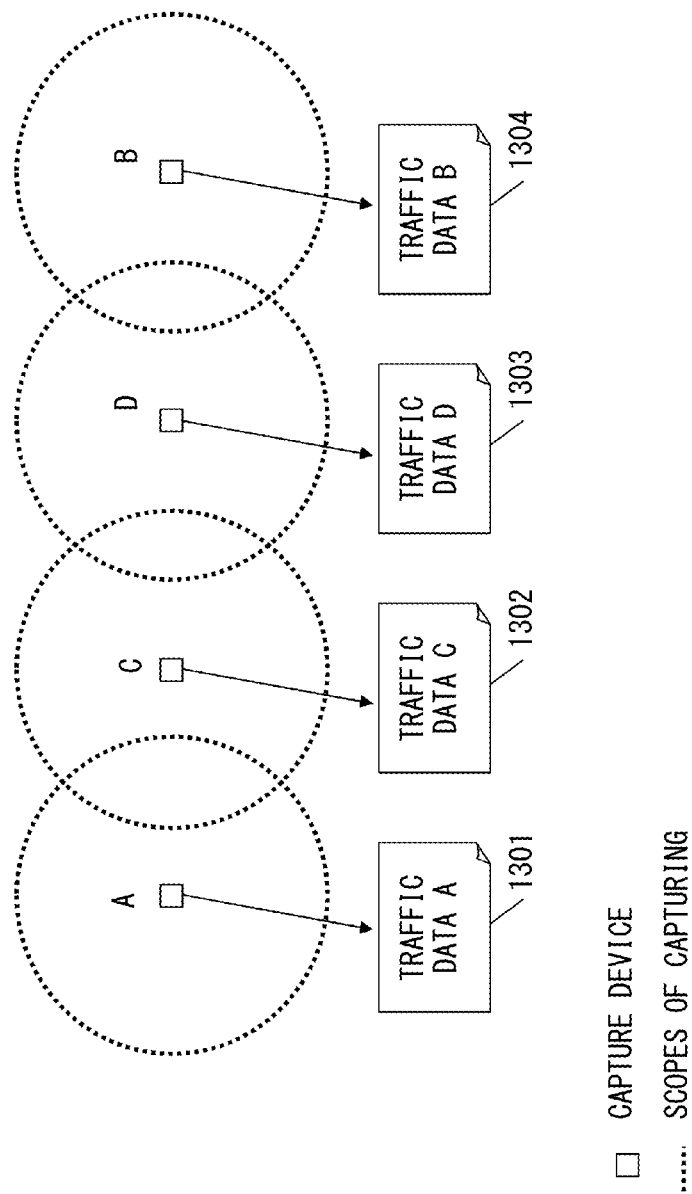
FIG. 13 illustrates an image of a network for explaining a method of determining adjacency relationships between scopes of capturing so as to increase the accuracy in time correction according to the third embodiment.

For example, a case is discussed in which there are four capture devices A through D as illustrated in FIG. 13, and the scopes of capturing are arranged in a line in the order of A, C, D, and B.

There is no duplication between pieces of frame data between traffic data A (1301) and traffic data B (1304) because their corresponding scopes of capturing do not overlap, and thus time correction is not conducted.

However, traffic data A (1301) and traffic data C (1302), traffic data C (1302) and traffic data D (1303), and traffic data D (1303) and traffic data B (1304) may include duplicated pieces of data because their corresponding scopes of capturing overlap.

Accordingly, time correction is conducted between traffic data A (1301) and traffic data C (1302), and thereafter between corrected traffic data C (1302) and traffic data D (1303), and as the last combination between corrected traffic data D (1303) and traffic data B (1304), and thereby the times of four groups of traffic data are corrected.

As described above, different time correction results occur depending upon differences in the order in which time correction is conducted, and accordingly a configuration is realized in which time correction is conducted in the optimum order by determining whether or not traffic data includes duplicated pieces of data.

In order to perform integration in the optimum order as described above, a third embodiment employs the following methods. First, as illustrated in FIG. 14, a table on which files of pieces of traffic data are arranged in order of integration (integration order table) and a table for storing files of pieces of traffic data as integration targets (file list table) are provided. On the integration order table, the file specified as the time reference (labeled traffic data A in this example) is stored as the first file.

<I> Traffic data A is searched for a piece of data that is in duplicate with a piece of data in traffic data on the file list table. The order of searching is the descending order from traffic data B through traffic data D starting from the top of the file list table. Because of the locations of the capture devices as illustrated in FIG. 13, a duplicated piece of data is retrieved in traffic data C. A retrieved piece of traffic data is stored in the integration order table as illustrated in "I" of FIG. 14.

<II> When the search in traffic data A on the integration order table is terminated, traffic data C (which has been stored in the integration order table in "I") is similarly searched for a piece of data that is in duplicate with a piece of data on the file list table. Because of the locations of the capture devices in FIG. 13, traffic data D is retrieved as a result and traffic data D is stored on the integration order table as illustrated in "II" of FIG. 14.

<III> A search is conducted similarly to <I> and <II>. Because of the locations of capture devices illustrated in FIG. 13, traffic data B is retrieved ("III" of FIG. 14).

<IV> When all pieces of traffic data have been searched on the integration order table or when there are no more pieces of traffic data as a search target on the file list table, the search is terminated ("IV" of FIG. 14). When a piece of traffic data remains on the file list table, the data is not duplicated, which indicates that there is a piece of traffic data for which time correction is not able to be conducted.

By the above method, pieces of traffic data are arranged on the integration order table in the optimum order for integration, making it possible to integrate pieces of traffic data on the table in descending order.

Figure 15:
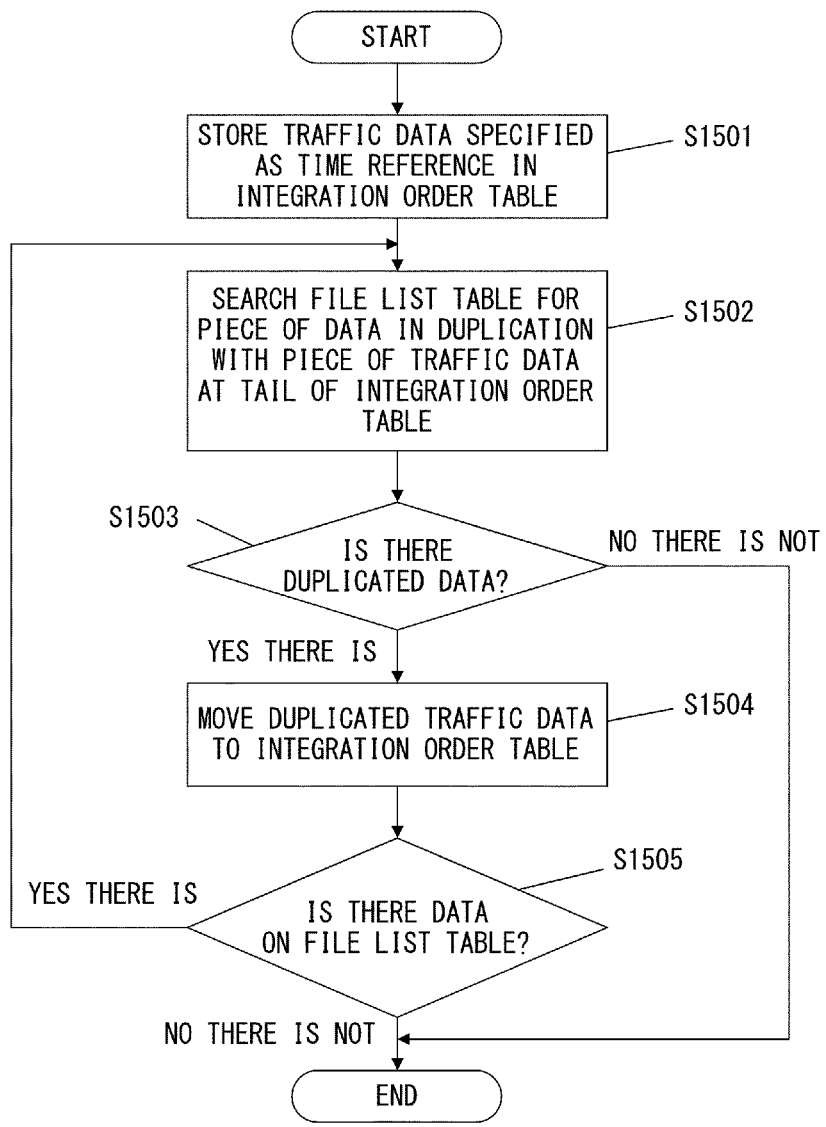
FIG. 15 is a flowchart for an integration order determination process according to the third embodiment.

FIG. 15 is a flowchart for an integration order determination process that is executed by the integration order determination unit 2-1 in FIG. 2 in order to execute operations of the third embodiment described above.

First, the traffic data serving as the time reference is stored in the integration order table (step S1501).

Next, the file list table is searched for a piece of data that is in duplication with the piece of traffic data at the tail of the integration order table (step S1502).

Next, it is determined whether or not the result of the above search indicates the presence of duplicated data (step S1503).

When there is duplicated data, the duplicated traffic data is moved to the integration order table (from step S1503 to step S1504).

Next, it is determined whether or not there is data on the file list table (step S1505).

When there is data on the file list table, the process returns to step S1502, and the file list table is further searched for a piece of data in duplicate with the piece of traffic data at the tail of the integration order table (step S1502).

When it has been determined in step S1503 that there is no duplicated data or when it has been determined in step S1505 that there are no more pieces of data on the file list table, the integration order determination process is terminated.

As described above, the third embodiment determines the presence or absence of frames duplicated between pieces of traffic data so as to determine the adjacency relationships of capture devices, thus realizing determination of an integration order when three or more pieces of traffic data are to be integrated by executing the integration order determination process (the integration order determination unit 2-1 in FIG. 2).

After the determination of integration order performed as described above, two pieces of traffic data selected in accordance with the integration order are treated as traffic data1 and traffic data2, and a time correction process and a duplicated frame deletion process are executed. These processes are similar to the time correction process explained in the first embodiment and the duplicated frame deletion process explained in the first or second embodiment, respectively.

Explanations will be given for a fourth embodiment of a traffic data integration apparatus.

Figure 16:
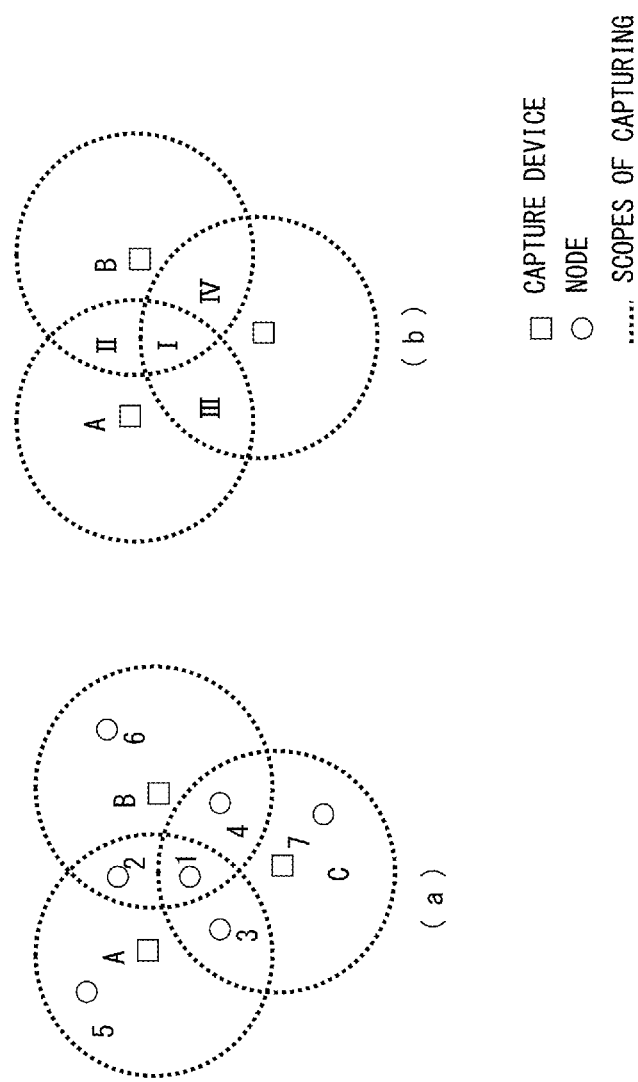
FIG. 16 explains a method of estimating the logical position of a node by using duplicated frame data according to the fourth embodiment.

FIG. 16 explains a method of estimating a logical position of a node by using duplicated frame data in the fourth embodiment.

In addition to time stamps and frame data, traffic data can include wireless physical information obtained from the hardware of capture devices. One example of such information is the signal strength indication (SSI) of wireless communications.

FIG. 16(a) illustrates position relationships between nodes and capture devices on a network. The scopes over which respective capture devices can capture traffic data are represented by dashed-line circles. Scopes of capturing in the fourth embodiment are portrayed on the assumption that they are circular; however, scopes of capturing may vary in shape depending upon the positions of obstacles in actual networks.

In FIG. 16(a), capture device A captures pieces of data from nodes 1, 2, 3, and 5, capture device B captures pieces of data from nodes 1, 2, 4, and 6, and capture device C captures pieces of data from nodes 1, 3, 4, and 7.

FIG. 16(b) illustrates categorization into I through IV of the areas on which the scopes of capturing of capture devices A, B, and C overlap. How scopes of capturing overlap with each other is determined on the basis of the positional information of the capture devices and the distances from the capture devices. Positional information of capture devices can be obtained, for example, by using information obtained from a GPS (Global Positioning System) installed in a capture device or by using positional information that users have obtained beforehand. The distance for estimating scopes of capturing is determined in accordance with the specifications of a network in which capturing is performed.

When frame data transmitted from node1 is included in all traffic data of capture devices A, B, and C, node1, which is the transmission source of the frame, is estimated to be in area I in FIG. 16(b). Similarly, when data transmitted from node2 is included in traffic data of capture devices A and B, node2 is estimated to be in area II in FIG. 16(b). The same method is applied to areas III and IV.

In the above described method, it is possible to roughly estimate the location of a node on the basis of the degree to which frame data is duplicated.

In FIG. 16, data is integrated in the union of A and B, i.e., A∪B for node1 and node2 in the intersection of A and B, i.e., A∩B, and data is integrated between set A∪B and C, so that data of node3, node1, and node4 is integrated. As a general rule, when scopes of capturing in which there is duplication overlap, data can be integrated by repeating data integration for the overlapping of the two scopes of capturing.

FIGS. 17A and 17B illustrate examples of data configurations of a duplicated frame table and a positional information table provided in the positional information management unit 11 illustrated in FIG. 2 so as to implement the operations of the above fourth embodiment.

The duplicated frame table illustrated in FIG. 17A holds time stamps after time correction, identification information of frame data, identification information of the transmission source node that transmitted the frame data, and identification information of capture devices that detected the frame data. The example in FIG. 17A indicates that frame data "BBBBBBBB" having the time stamp "2010/7/7 18:00:03.000" from transmission source node1 was detected by three capture devices A, B, and C. It also indicates that frame data "CCCCCCCC" having time stamp "2010/7/7 18:00:07.000" from transmission source node2 was detected by two capture devices A and B.

The positional information table illustrated in FIG. 17B holds identification information of capture devices, X- and Y-coordinates of arranged positions of the capture devices, and scopes of capturing (the distance from the center position at which each capture device is arranged). The example of FIG. 17B indicates that capture device A has X- and Y-coordinates (100, 300) as the arranged position and that the scopes of capturing is 150. It also indicates that capture device B has X- and Y-coordinates (300, 250) as the arranged position and that the scopes of capturing is 150. It further indicates that capture device C has X- and Y-coordinates (200, 100) as the arranged position and that the scopes of capturing is 150.

Figure 18:
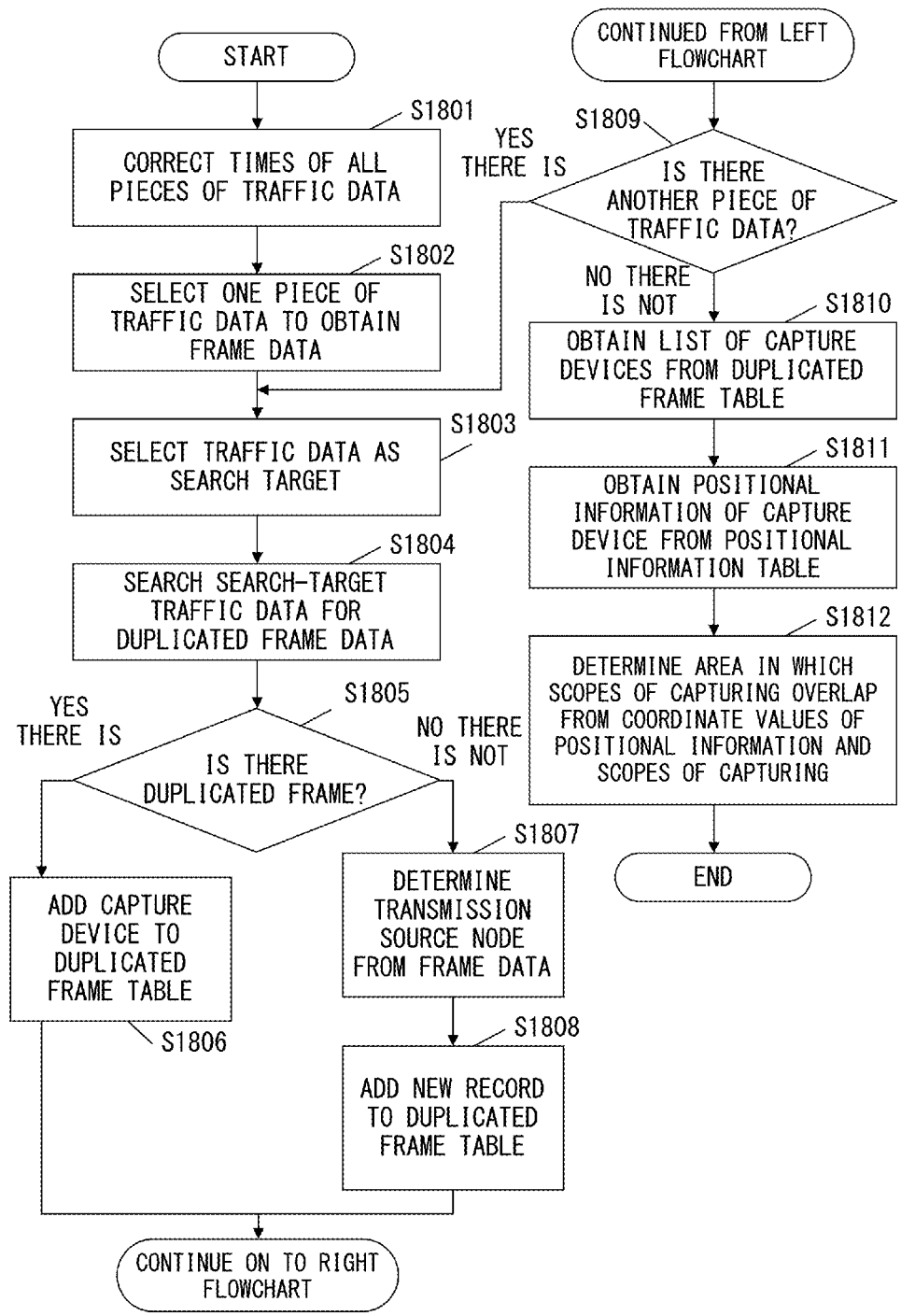
FIG. 18 is a flowchart for a process of estimating the position of a node on the basis of overlapping of scopes of capturing according to the fourth embodiment.

FIG. 18 is a flowchart for a process of estimating the position of a node on the basis of the overlapping of scopes of capturing, which is executed by the positional information management unit 11 illustrated in FIG. 2 so as to implement the operations of the above fourth embodiment.

First, the times of all pieces of traffic data are corrected (step S1801) by the time correction unit 8 illustrated in FIG. 2 by using the method described in the first embodiment (the flowchart in FIG. 6 executed by the time correction unit 8 in FIG. 2).

Next, one piece of traffic data that has received the time correction of step S1801 is selected, and the frame data is obtained (step S1802).

Next, search-target traffic data that has received the time correction of step S1801 is selected (step S1803).

Next, the search-target traffic data selected in step S1803 is searched for duplicated frame data (step S1804).

It is determined whether or not there is a duplicated frame (step S1805).

When it has been determined in step S1805 that there is a duplicated frame, the identification information of the capture device is added to the duplicated frame table (see FIG. 17A) (step S1806).

When it has been determined in step S1805 that there is not a duplicated frame, the transmission source node is determined (step S1807) from the frame data obtained in step S1802.

Then, a new record, i.e., a set of information including the time stamp, the frame data, and the transmission source node, is added to the duplicated frame table (FIG. 17A) (step S1808).

After the process in step S1806 or step S1808, it is determined whether or not there is another piece of traffic data that has received time correction in step S1801 as a search target (step S1809).

When it has been determined in step S1809 that there is another piece of traffic data, the process returns to step S1803, and the piece of traffic data is selected as a new search target, and a search is conducted for duplicated frame data.

When it has been determined in step S1803 that there is not another piece of traffic data, a list of capture devices is obtained from the duplicated frame table (FIG. 17A) (step S1810).

Next, positional information (the X and Y coordinates of the arranged position and the scopes of capturing) of each capture device in the list obtained in step S1810 is obtained from the positional information table (FIG. 17B) (step S1811).

Thereby, an area in which scopes of capturing overlap is determined from the X- and Y-coordinate values of each positional information and the scopes of capturing obtained in step S1811 (step S1812).

FIGS. 19A and 19B explain a method of generating information to estimate the positions of nodes on the basis of duplicated frame data and physical information in wireless communications according to a fourth embodiment.

It is assumed for example that the signal strengths of data that was transmitted from node1 in area I illustrated in FIG. 16 (b) to be captured by capture devices A, B, and C are SSI[A], SSI[B], and SSI[C].

When the frame search unit 9 in FIG. 2 has detected duplication of frame data, the following control is performed. The identification information (2101) of the transmission source node of the frame data, the identification information (2102) of the capture device that captured the frame data, and the signal strength (2103) when the frame data was captured are stored in the management table exemplified in FIG. 19A. By using information on this management table and positional information of capture devices, it is possible to estimate positions of nodes. In other words, as illustrated in FIG. 19B, the position of a node can be estimated on the basis of the distance from each capture device, which is in proportion to the signal strength detected in each capture device.

FIG. 20A and FIG. 20B illustrate examples of data configurations of a duplicated frame table and a positional information table provided in the positional information management unit 11 illustrated in FIG. 2 for implementing operations of the fourth embodiment illustrated in FIG. 19A and FIG. 19B.

The duplicated frame table in FIG. 20A holds time stamps after the time correction, the identification information of frame data, identification information of the transmission source node that transmitted the frame data, and the identification information of a capture device that detected the frame data as with FIG. 17A. Further, the duplicated frame table stores, for each capture device, the signal strength (decibel value) when the frame data was detected by the capture device.

The example in FIG. 20A indicates that frame data "BBBBBBBB" having the time stamp of "2010/7/7 18:00: 03.000" transmitted from transmission source node1 was detected by three capture devices A, B, and C. It also indicates that the signal strengths at the respective capture devices are −50 dBm, −70 dBm, and −65 dBm. It also indicates that frame data "CCCCCCCC" having the time stamp of "2010/7/7 18:00:07.000" transmitted from transmission source node2 was detected in two capture devices A and B. It also indicates that the signal strengths at capture devices A and B are −55 dBm and −55 dBm respectively.

The positional information table illustrated in FIG. 20B holds the identification information of capture devices, and the X- and Y-coordinates of the arranged positions of capture devices. The example in FIG. 20B indicates that the capture device A has X- and Y-coordinate values (100, 300) as its arranged position, capture device B has X- and Y-coordinate values (300, 250) as its arranged position, and capture device C has X- and Y-coordinate values (200, 100) as its arranged position.

Figure 21:
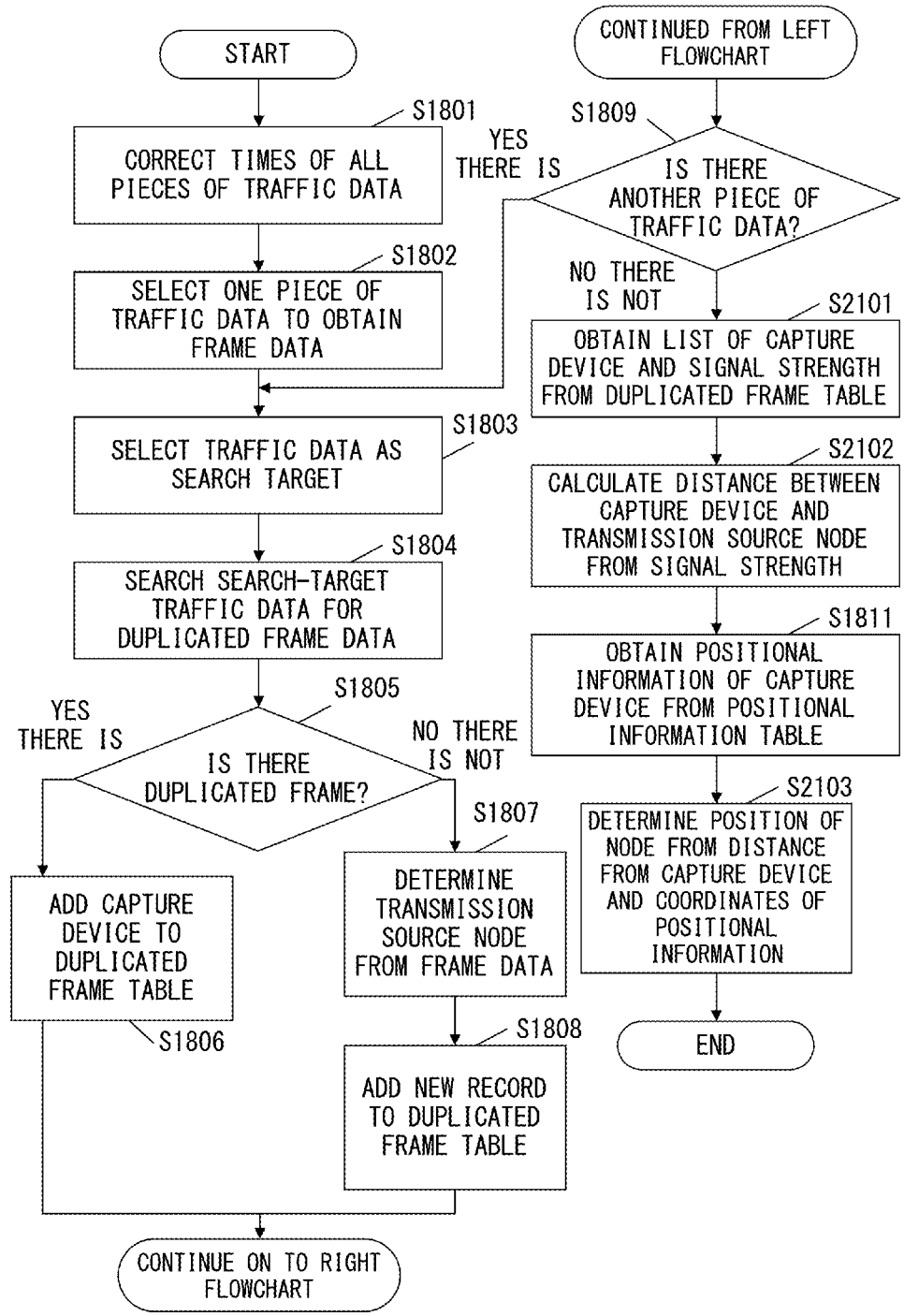
FIG. 21 is a flowchart for a process of estimating the position of a node on the basis of differences between signal strengths according to the fourth embodiment.

FIG. 21 is a flowchart for a process of estimating the position of a node on the basis of the difference between signal strengths, which is executed by the positional information management unit 11 illustrated in FIG. 2 in order to implement operations of the fourth embodiment illustrated in FIG. 19A and FIG. 19B. In FIG. 21, steps similar to those in the process in FIG. 18 are denoted by similar step numbers.

The flowchart in FIG. 21 is different from that in FIG. 18 in that steps S2101 and S2102 are executed instead of step S1810 of FIG. 18, and step S2103 is executed instead of step S1812 of FIG. 18.

When the identification information of a capture device is added to the duplicated frame table (see FIG. 20A) in step S1806 in FIG. 21, information on the signal strength is also added together with the identification information.

When all settings of information to the duplicated frame table are completed, the list of capture devices and signal strengths is obtained from the duplicated frame table (step S2101).

Next, the distance between each capture device and the transmission source node is calculated on the basis of the signal strength (step S2102) (see FIG. 20B).

Next, the positional information (the X- and Y-coordinate values of the arranged position) of each capture device in the list obtained in step S2101 is obtained from the positional information table (FIG. 20B) (step S1811).

Then, the position of the node is determined on the basis of the X- and Y-coordinate values of each piece of positional information obtained in step S1811 and the distance from each capture device calculated in step S2102 (step S2103).

As described above, in the fourth embodiment, it is possible to estimate logical position relationships with transmission source nodes of respective pieces of frame data of traffic data on the basis of traffic data collected from a plurality of capture devices.

In the respective embodiments described above, it is possible to avoid a situation where frame data causing a repeated appearance of the same data patterns in the same capture device is used as frame data for time correction.

Also, according to the first embodiment, it is possible to perform time correction accurately even when there are significant time differences between capture devices by limiting the time difference of frame data that is used when time correction is performed.

FIG. 22 illustrates an example of a hardware configuration of a computer that is capable of implementing as a software process the traffic data integration apparatuses according to the first through fourth embodiments.

The computer illustrated in FIG. 22 includes a CPU 2201, a memory 2202, an input device 2203, an output device 2204, an external storage device 2205, a portable recording medium driving device 2206 into which a portable recording medium 2209 is inserted, and a communication interface 2207, which are connected to each other through a bus 2208. The configuration illustrated in FIG. 22 is an example of a computer that is capable of implementing the above system, and computers to implement the above system are not limited to this configuration.

The CPU (Central Processing Unit) 2201 is a processor that performs control of the entire computer. The memory 2202 is a memory such as a RAM. etc. that temporarily stores programs or data stored in the external storage device 2205 (or the portable recording medium 2209) when those programs are executed, when the data is updated, or in other cases. The CPU 2201 reads a program onto the memory 2202, and performs it so as to perform total control.

The input device 2203 detects input operations performed by a user through a keyboard, a mouse, or the like, reports the detection results to the CPU 2201, and outputs, to a display device or a printing device, data transmitted in accordance with the control performed by the CPU 2201.

The external storage device 2205 is, for example, a hard-disk storage device. This is used mainly for saving various types of data or programs.

The portable recording medium driving device 2206 accommodates the portable recording medium 2209, which may be an optical disk, a SDRAM, a CompactFlash (registered trademark) card, etc., and has a function of a subsidiary element for the external storage device 2205.

The communication interface 2207 is a device that connects communication lines of, for example, a LAN (Local Area Network) or a WAN (Wide Area Network).

The systems according to the first through fourth embodiments are implemented by the execution, by the CPU 2201, of a program including functions implemented by flowcharts, etc. illustrated in FIG. 5, 6, 8, 11, 15, 18, 21, or others. Such a program may also be distributed in the form in which it has been recorded in, for example, the external storage device 2205 or the portable recording medium 2209, or may also be obtained from a network through the communication interface (network connection device) 2207.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A traffic data integration method comprising: determining, by using a computer, pieces of frame data having a same data pattern between first traffic data and second traffic data collected respectively by first and second capture devices that capture frame data communicated by a node in a network;

performing, by using the computer, a time correction process by which a time of each piece of frame data in the first traffic data or the second traffic data is corrected so that the first traffic data and the second traffic data have an identical capturing time of the pieces of determined frame data having the same data pattern except for frame data for which retransmission data includes the pieces of determined frame data; and determining whether the pieces of frame data selected from each of pieces of the first and the second traffic data that were collected respectively by the first and second capture devices and that received the time correction process have a same data pattern, and determining whether the pieces of selected frame data after the time correction process have a time stamp difference within a predetermined time range, wherein when the pieces of selected frame data have the same data pattern and a time stamp difference within the predetermined time range, the computer determines that pieces of the selected frame data are of a same data frame, and merges the pieces of the first and second traffic data.

2. The traffic data integration method according to claim 1, wherein:

an adjacency relationship of capture devices is determined, by using the computer, by determining a presence or absence of duplicated frames between pieces of traffic data so as to determine an order of integrating data when pieces of the traffic data respectively collected by three or more capture devices are integrated.

3. The traffic data integration method according to claim 1, wherein:

a logical position relationship of a node in the network is measured, by using the computer, based on wireless physical information included in the pieces of the determined frame data having the same data pattern and positional information of a capture device that transmitted the pieces of the determined frame data having the same data pattern.

4. The traffic data integration method according to claim 1, further comprising:
restricting a time difference of frame data used when the time correction process is performed.

5. The traffic data integration method according to claim 1, wherein
the determining process determines the retransmission data on a basis of a retransmission flag assigned to a data frame.

6. A traffic data integration apparatus, comprising:
a memory; and
a computer processor that executes a control process comprising:
determining, by using the computer processor, pieces of frame data having a same data pattern between first traffic data and second traffic data collected respectively by first and second capture devices that capture frame data communicated by a node in a network;
performing, by using the computer processor, a time correction process by which a time of each piece of frame data in the first traffic data or the second traffic data is corrected so that the first traffic data and the second traffic data have an identical capturing time of the pieces of determined frame data having the same data pattern except for frame data for which retransmission data includes the pieces of determined frame data; and
determining, by using the computer processor, whether the pieces of frame data selected from each of pieces of the first and the second traffic data that were collected respectively by the first and second capture devices and that received the time correction process have a same data pattern, and determining whether the pieces of selected frame data after the time correction process have a time stamp difference within a predetermined time range,
wherein when the pieces of selected frame data have the same data pattern and a time stamp difference within the predetermined time range, the computer determines that pieces of the selected frame data are of a same data frame, and merges the pieces of the first and the second traffic data.

7. The traffic data integration apparatus according to claim 6, wherein:
the control process further determines an adjacency relationship of capture devices by determining a presence or absence of duplicated frames between pieces of traffic data so as to determine an order of integrating data when pieces of the traffic data respectively collected by three or more capture devices are integrated.

8. The traffic data integration apparatus according to claim 6, wherein:
the control process further measures a logical position relationship of a node in the network based on wireless physical information included in the pieces of the determined frame data having the same date pattern and positional information of a capture device that transmitted the pieces of the determined frame data having the same data pattern.

9. The traffic data integration apparatus according to claim 6, wherein
the control process further includes restricting a time difference of frame data used when the time correction process is performed.

10. The traffic data integration apparatus according to claim 6, wherein
the determining process includes determining the retransmission data on a basis of a retransmission flag assigned to a data frame.

* * * * *